US011588433B2

(12) United States Patent
Suan et al.

(10) Patent No.: US 11,588,433 B2
(45) Date of Patent: Feb. 21, 2023

(54) PHOTOVOLTAIC MODULE CLAMP SYSTEM AND METHOD

(71) Applicant: SUNFOLDING, INC., San Francisco, CA (US)

(72) Inventors: Eric Preston Lien Suan, Baltimore, MD (US); Jeffrey Charles Lamb, San Francisco, CA (US)

(73) Assignee: Sunfolding, Inc., San Francisco, CA (US)

( * ) Notice: Subject to any disclaimer, the term of this patent is extended or adjusted under 35 U.S.C. 154(b) by 141 days.

(21) Appl. No.: 16/822,967

(22) Filed: Mar. 18, 2020

(65) Prior Publication Data

US 2020/0304057 A1 Sep. 24, 2020

Related U.S. Application Data

(60) Provisional application No. 62/819,951, filed on Mar. 18, 2019.

(51) Int. Cl.
*H02S 20/10* (2014.01)
*H02S 20/30* (2014.01)
*H02S 30/10* (2014.01)

(52) U.S. Cl.
CPC .............. *H02S 20/10* (2014.12); *H02S 20/30* (2014.12); *H02S 30/10* (2014.12)

(58) Field of Classification Search
CPC ......... Y02E 10/47; H02S 20/00; H02S 20/10; H02S 20/23; H02S 20/30; H02S 20/32; H02S 30/00; H02S 30/10; H02S 40/34; H01L 31/042
See application file for complete search history.

(56) References Cited

U.S. PATENT DOCUMENTS

2017/0040928 A1* 2/2017 Schuit .................... F24S 25/636
2018/0316307 A1* 11/2018 Martin ...................... F16B 2/12
2019/0379323 A1* 12/2019 Au ......................... F16H 19/025

* cited by examiner

*Primary Examiner* — Mayla Gonzalez Ramos
(74) *Attorney, Agent, or Firm* — Davis Wright Tremaine LLP

(57) ABSTRACT

A method of coupling solar panels to one or more rails via one or more module clamps to form at least a portion of a solar assembly. The method can include positioning a first and second solar panel on at least a first rail, the first and second solar panels being positioned adjacent and defining a slot between the first and second solar panels. The method can further include positioning a module clamp between the first and second solar panels in the slot between the first and second solar panels, the module clamp engaging the first and second solar panels and the first rail. The module clamp can include a bolt and a clamp head.

21 Claims, 17 Drawing Sheets

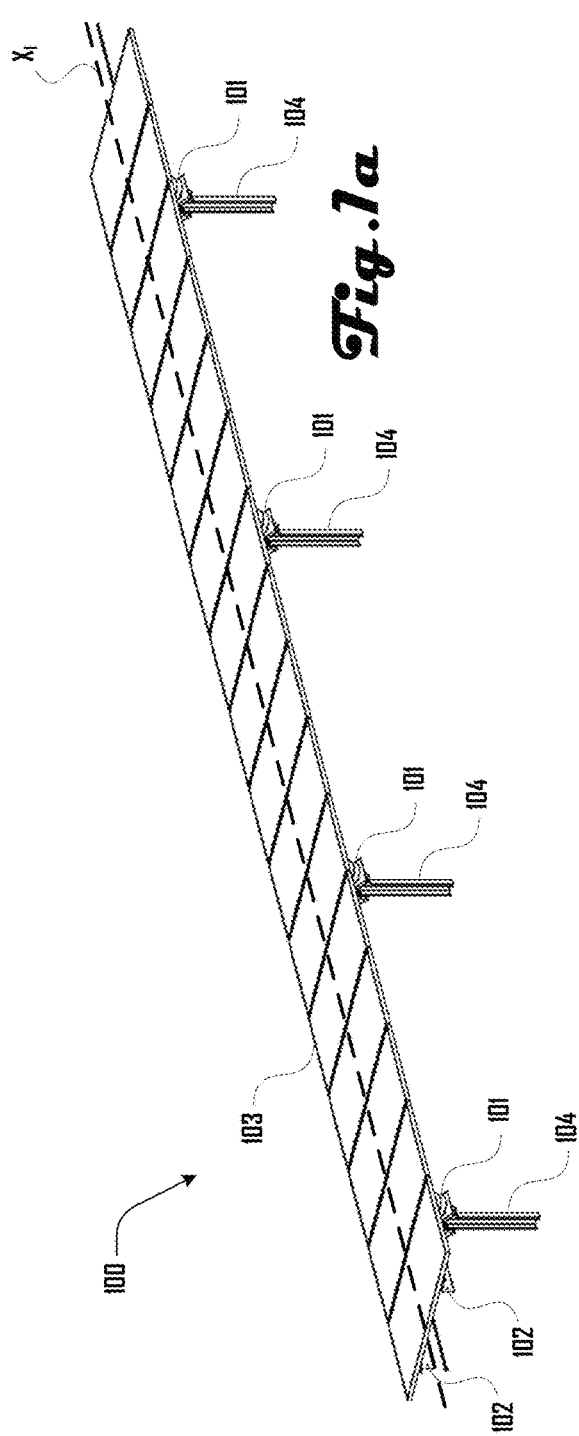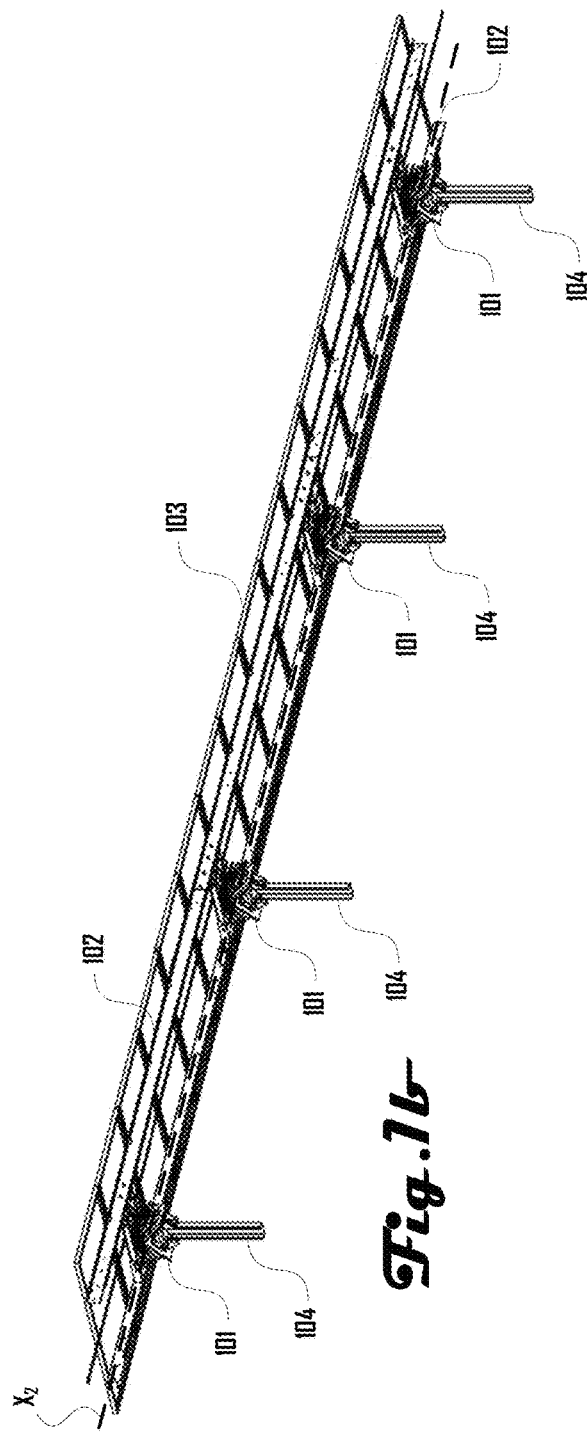

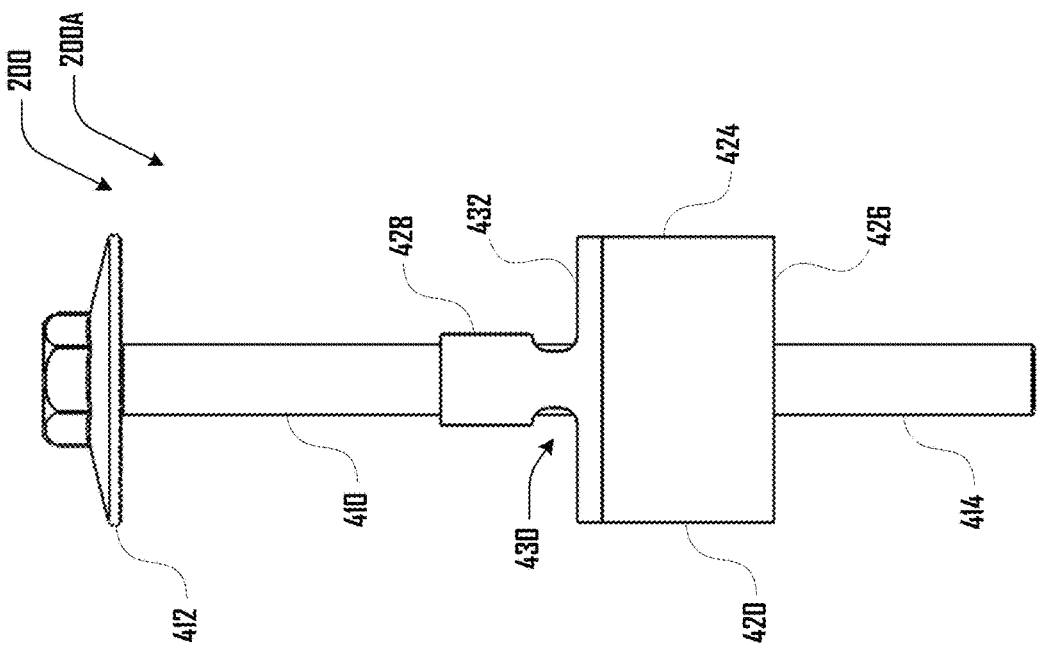
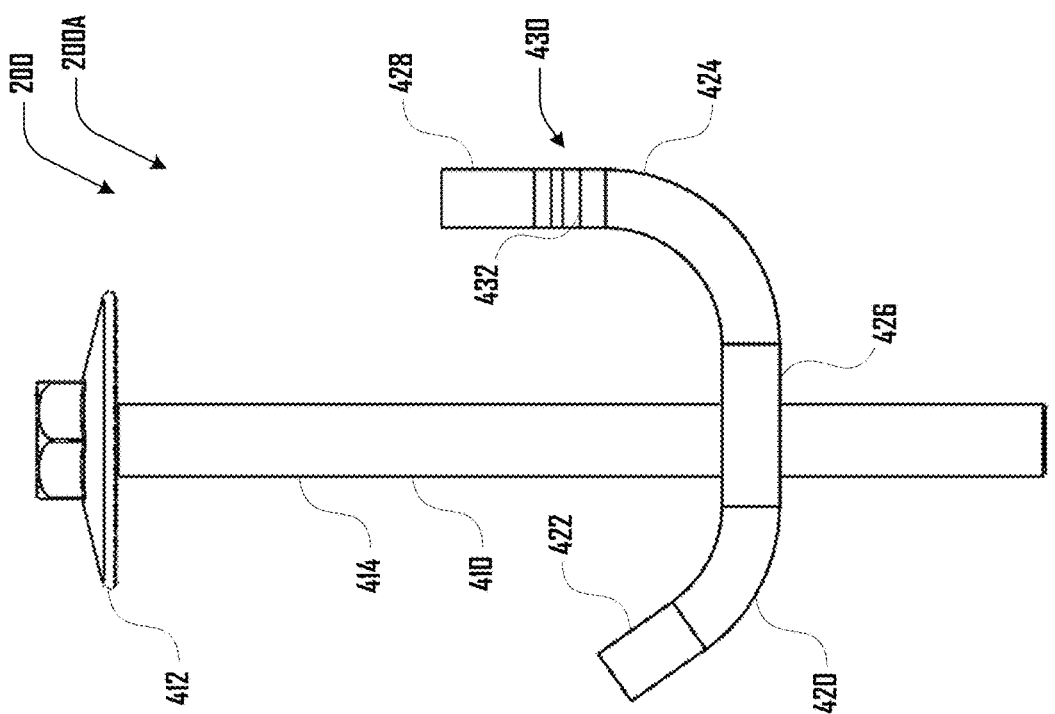

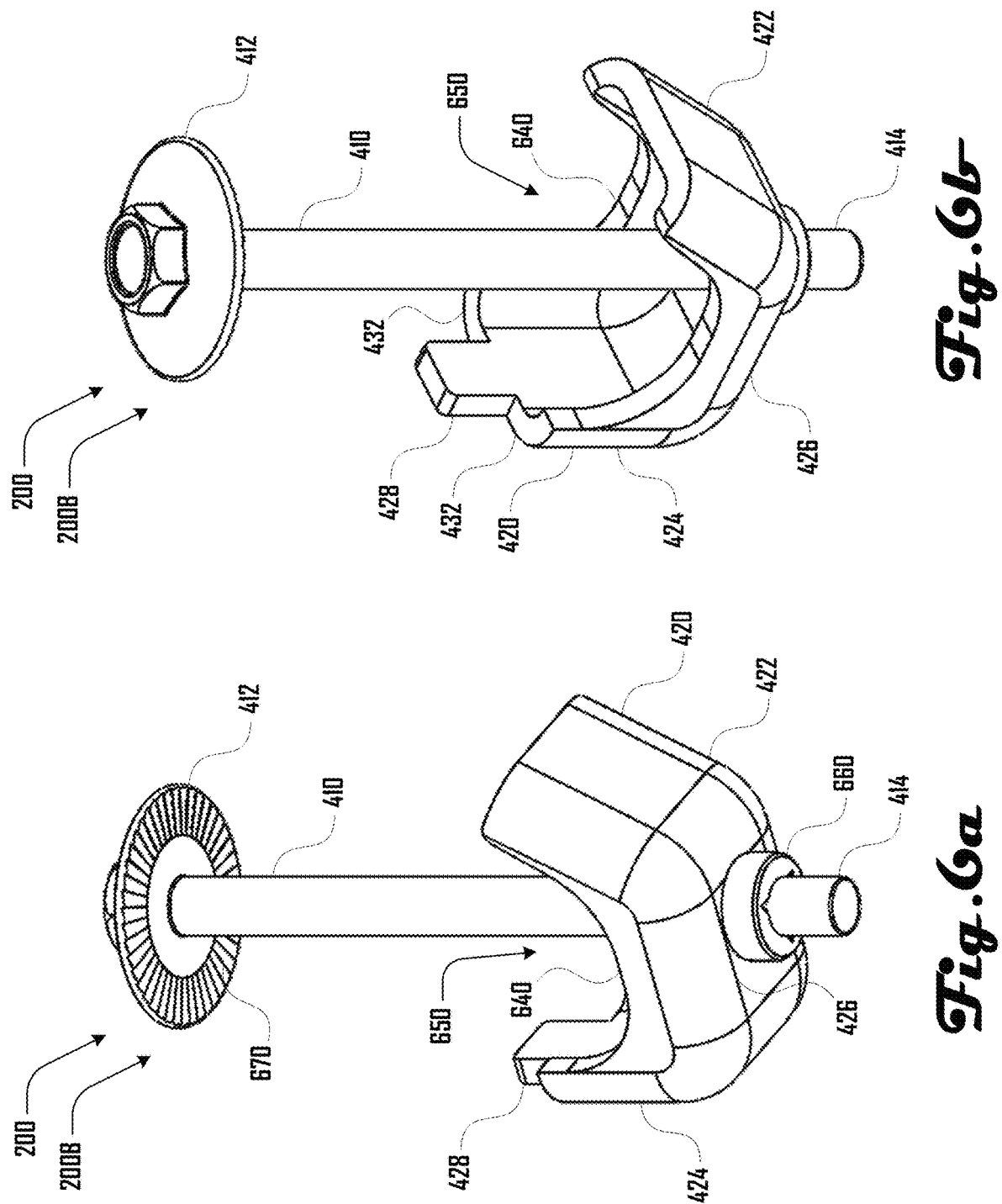

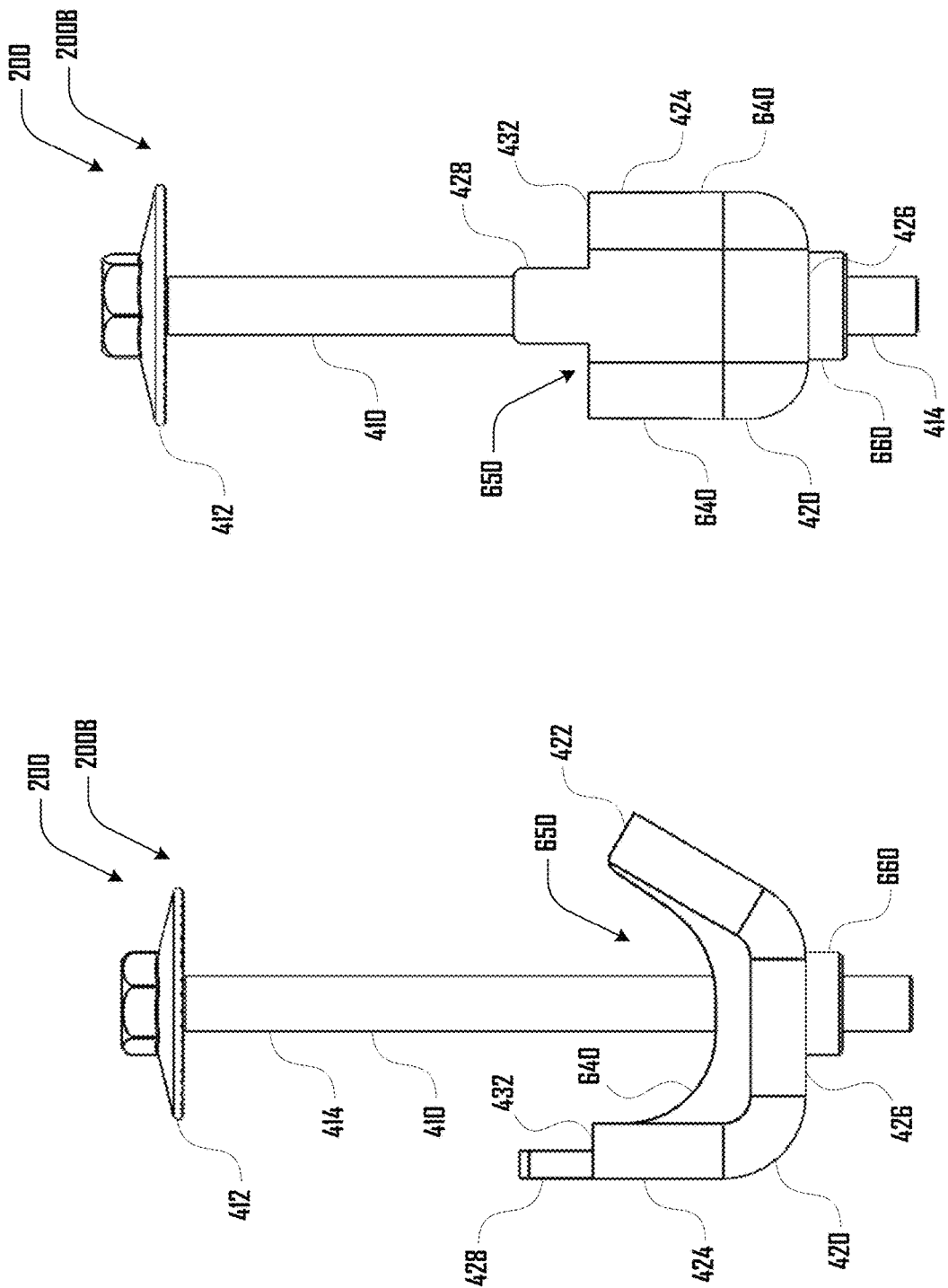

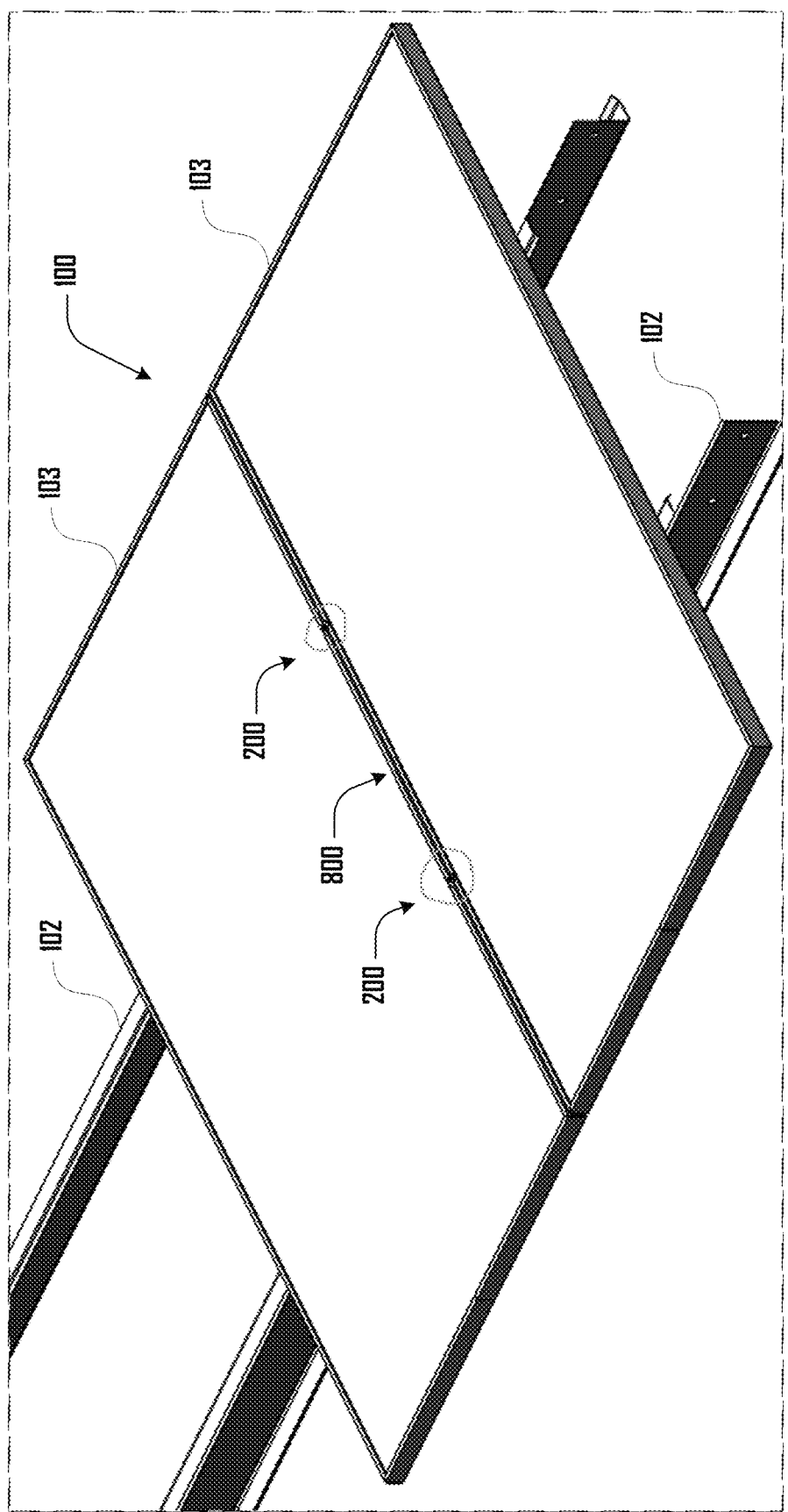

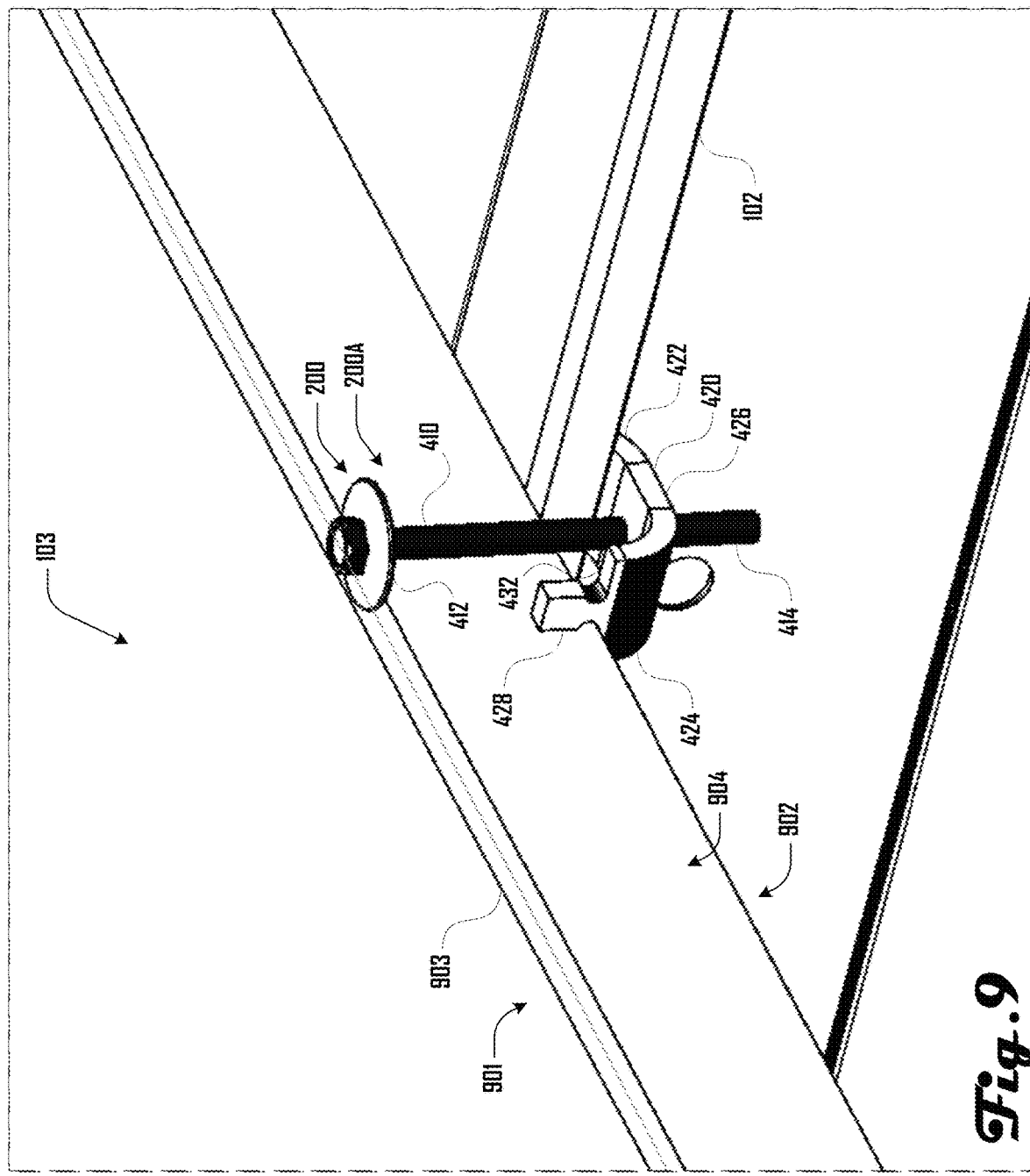

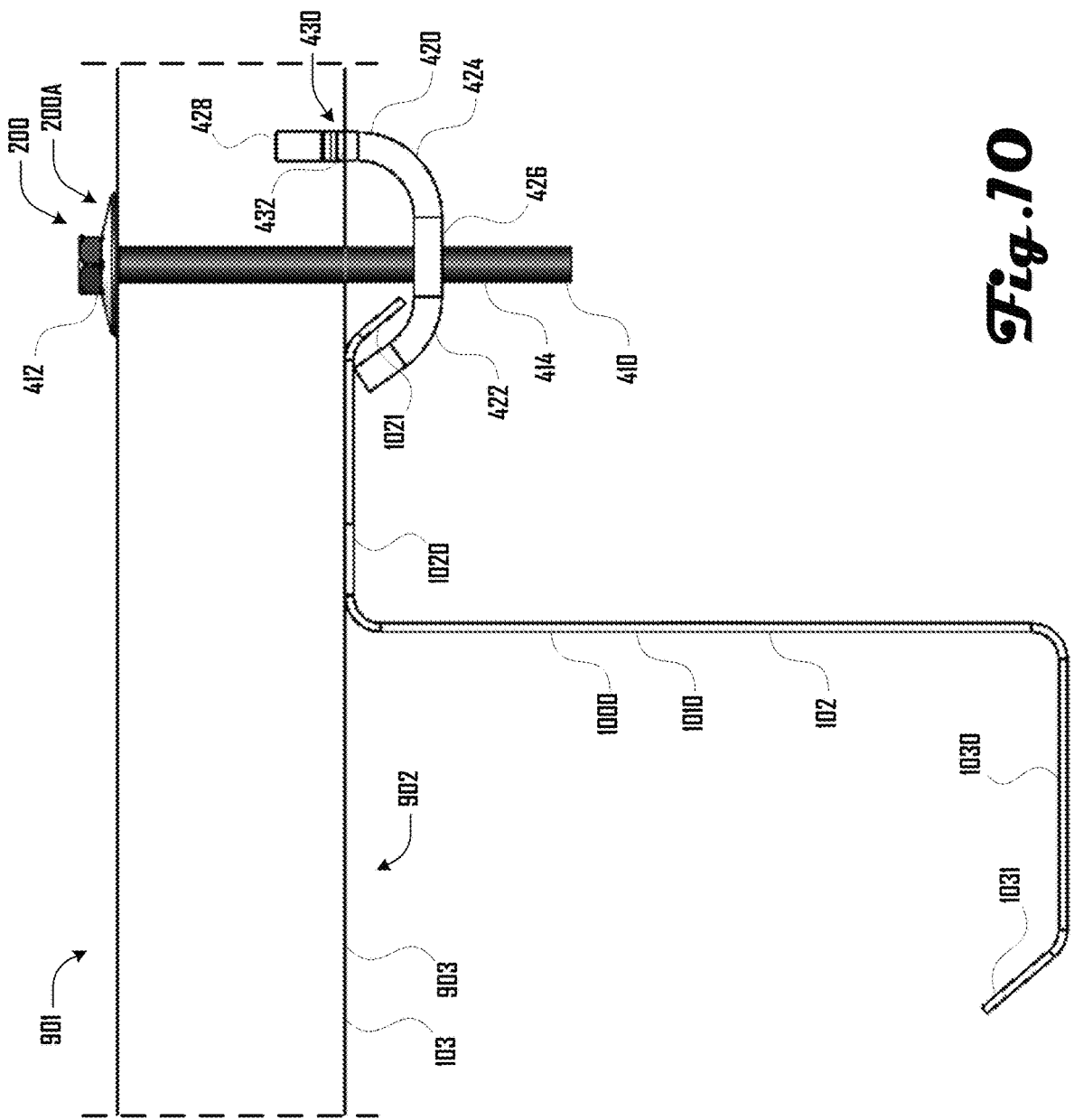

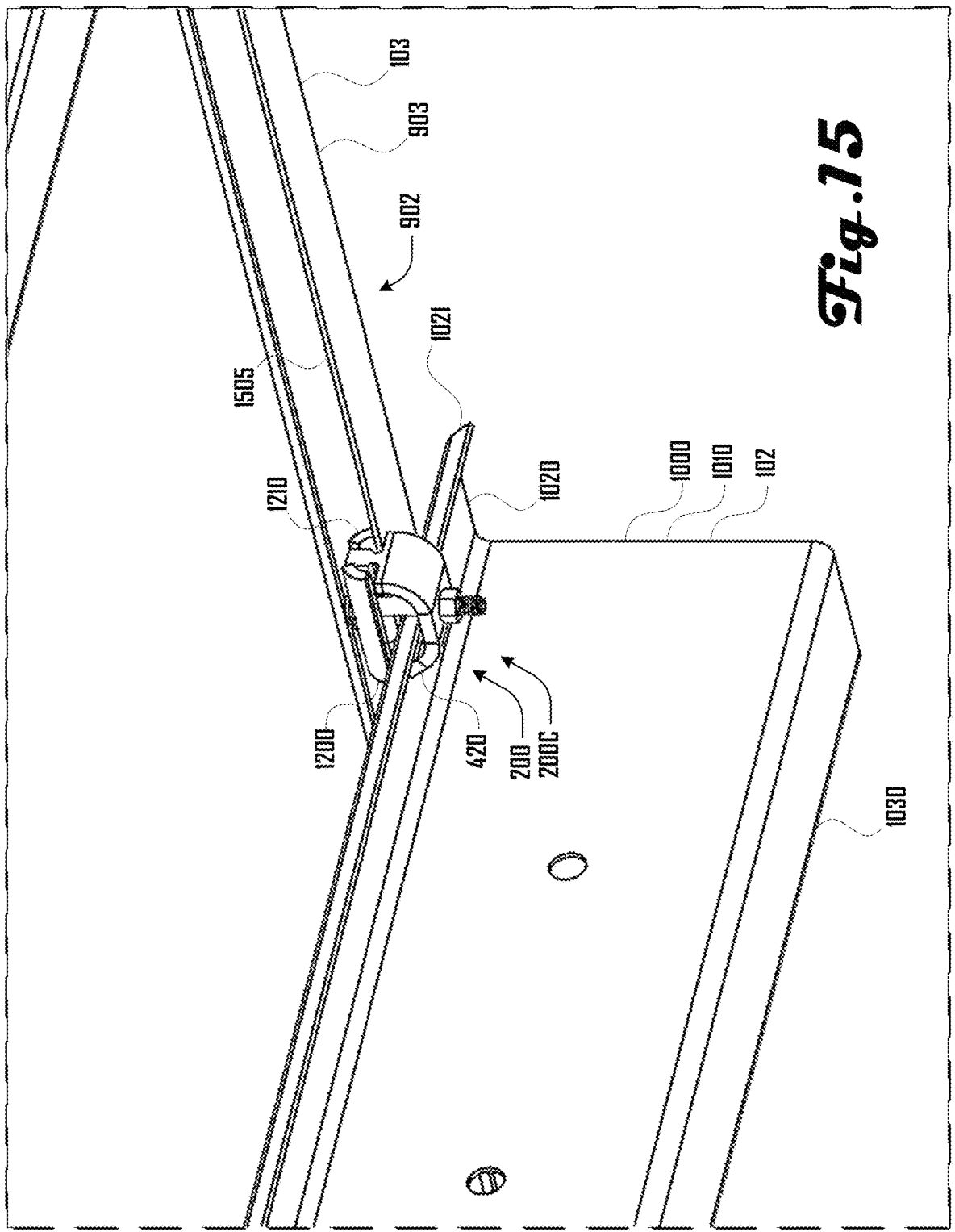

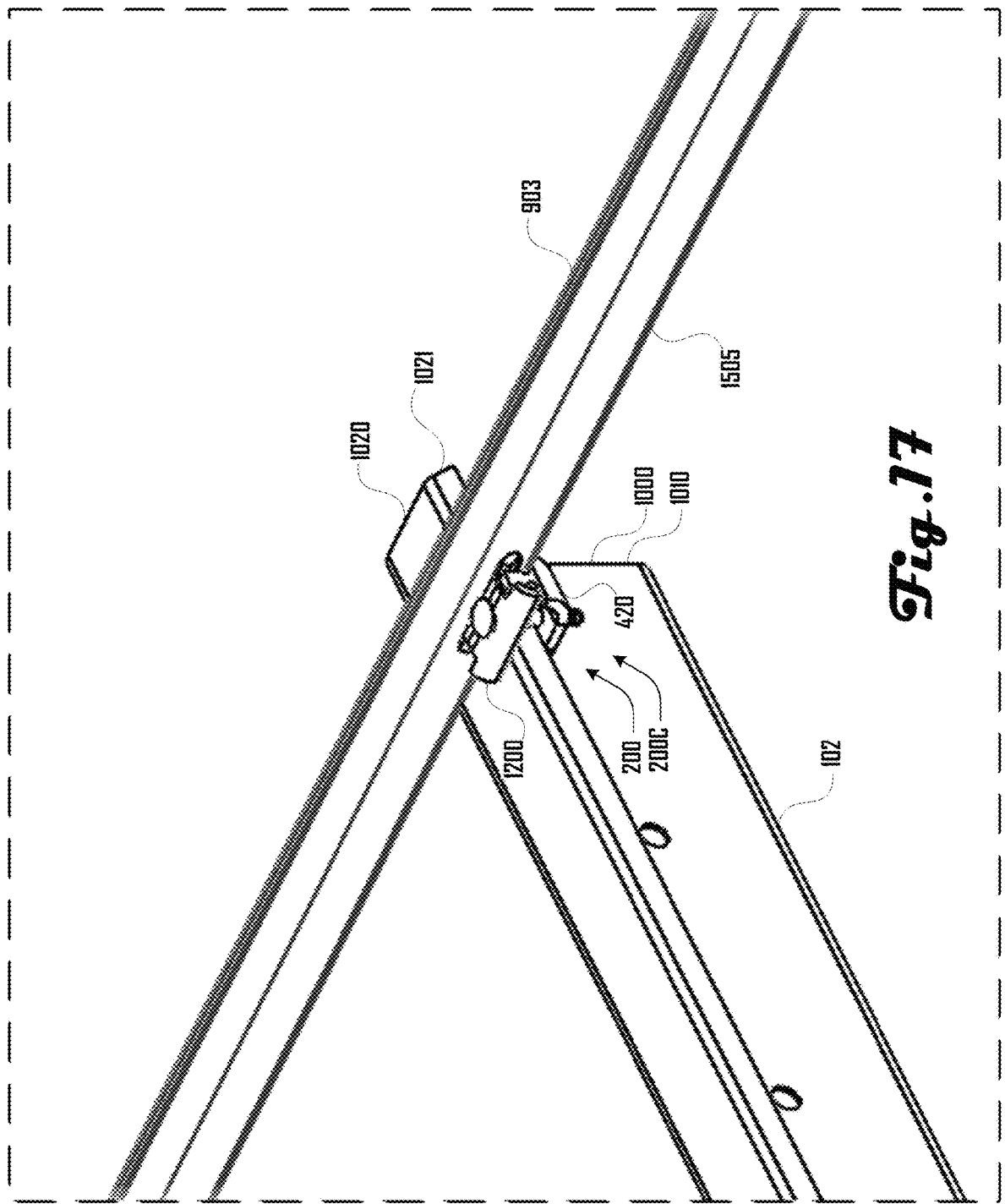

US 11,588,433 B2

PHOTOVOLTAIC MODULE CLAMP SYSTEM AND METHOD

CROSS-REFERENCE TO RELATED APPLICATIONS

This application is a non-provisional of and claims the benefit of U.S. Provisional Application No. U.S. Patent Application No. 62/819,951, filed Mar. 18, 2019, which application is hereby incorporated herein by reference in its entirety and for all purposes.

BRIEF DESCRIPTION OF THE DRAWINGS

FIG. 1a illustrates a top perspective view of a solar tracker in accordance with an embodiment.

FIG. 1b illustrates a bottom perspective view of the solar tracker of FIG. 1a

FIG. 5a is a first side view of the module clamp of FIG. 4.

FIG. 5b is a second side view of the module clamp of FIGS. 4 and 5a.

FIG. 6a is a first perspective view of a module clamp in accordance with another embodiment.

FIG. 6b is a second perspective view of the module clamp of FIG. 6a.

FIG. 7a is a first side view of the module clamp of FIGS. 6a and 6b.

FIG. 7b is a second side view of the module clamp of FIGS. 6a, 6b and 7a.

FIG. 8 illustrates a solar tracker having a pair of modules coupled to a rail via module clamps.

FIG. 9 illustrates a perspective view of a module clamp coupling a module with a rail.

FIG. 10 illustrates a side view of a module clamp coupling a module with a rail.

FIG. 12b illustrates a top view of the embodiment of the top claim shown in FIG. 12a.

FIG. 13a illustrates a perspective view of the embodiment of the module clamp of FIG. 13a with the top clamp and clamp head in a coupled configuration.

FIG. 15 illustrates an example of the module clamp of FIGS. 13a, 13b, 14a and 14b coupling a module to a rail.

FIG. 17 illustrates a further example of the module clamp of FIGS. 13a, 13b, 14a and 14b coupling a module to a rail.

Figure 2:
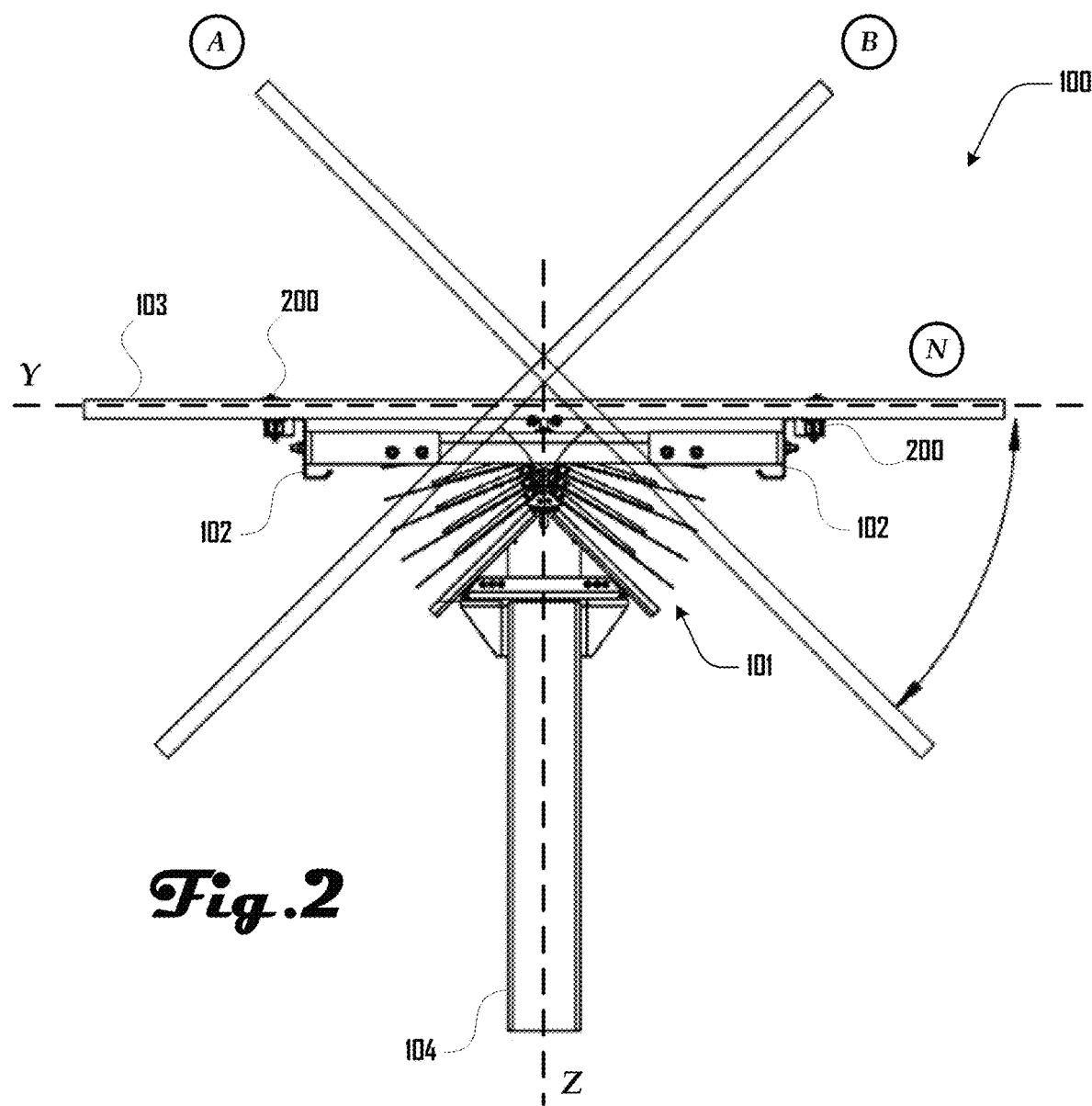
FIG. 2 illustrates a side view of a solar tracker in accordance with an embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

FIGS. 1a and 1b illustrate a respective top perspective and bottom perspective view of a solar tracker 100 in accordance with various embodiments. FIG. 2 illustrates a side view of the solar tracker 100. As shown in FIGS. 1a, 1b and 2, the solar tracker 100 can comprise a plurality of photovoltaic cells 103 disposed along a length having axis $X_1$ and a plurality of pneumatic actuators 101 configured to collectively move the array of photovoltaic cells 103. As shown in FIG. 1b, the photovoltaic cells 103 are coupled to rails 102 that extend along parallel axes $X_2$, which are parallel to axis $X_1$. Each of the plurality of actuators 101 extend between and are coupled to the rails 102, with the actuators 101 being coupled to respective posts 104. As shown in FIG. 2, the posts 104 can extend along an axis Z, which can be perpendicular to axes $X_1$ and $X_2$ in various embodiments.

As shown in FIG. 2, and discussed in more detail herein, the actuators 101 can be configured to collectively tilt the array of photovoltaic cells 103 based on an angle or position of the sun, which can be desirable for maximizing light exposure to the photovoltaic cells 103 and thereby maximizing, enhancing or optimizing electrical output of the photovoltaic cells 103. In various embodiments, the actuators 101 can be configured to move the photovoltaic cells 103 between a plurality of configurations as shown in FIG. 2, including a neutral configuration N where the photovoltaic cells 103 are disposed along axis Y that is perpendicular to axis Z. From the neutral configuration N, the actuators 101 can be configured to move the photovoltaic cells 103 to a first maximum tilt position A, to a second maximum tilt position B, or any position therebetween. In various embodiments, the angle between the neutral configuration N and the maximum tilt positions A, B can be any suitable angle, and in some embodiments, can be the same angle. Such movement can be used to position the photovoltaic cells 103 toward the sun, relative to an angle of the sun, to reflect light toward a desired position, or the like.

In one preferred embodiment as shown in FIGS. 1a and 1b, a solar tracker 100 can comprise a plurality of photovoltaic cells 103 that are collectively actuated by four actuators 101 disposed along a common axis. However, in further embodiments, a solar tracker 100 can comprise any suitable number of actuators 101 including one, two, three, four, five, six, seven, eight, nine, ten, fifteen, twenty, fifty, one hundred, or the like. Similarly, any suitable number of photovoltaic cells 103 can be associated with a solar tracker 100 in further embodiments. Also, any suitable size, shape or type of photovoltaic cells 103 can be associated with a solar tracker 100 in further embodiments. Additionally, while photovoltaic cells 103 are shown in example embodiments herein, in further embodiments, actuators 101 can be used to move various other objects or structures, including mirrors, reflectors, imaging devices, water purification, water collection, communications devices, and the like. In various embodiments as discussed in more detail herein, one or more module clamps 200 can be used to secure photovoltaic modules 103 to a racking system of a solar tracker 100.

Figure 3:
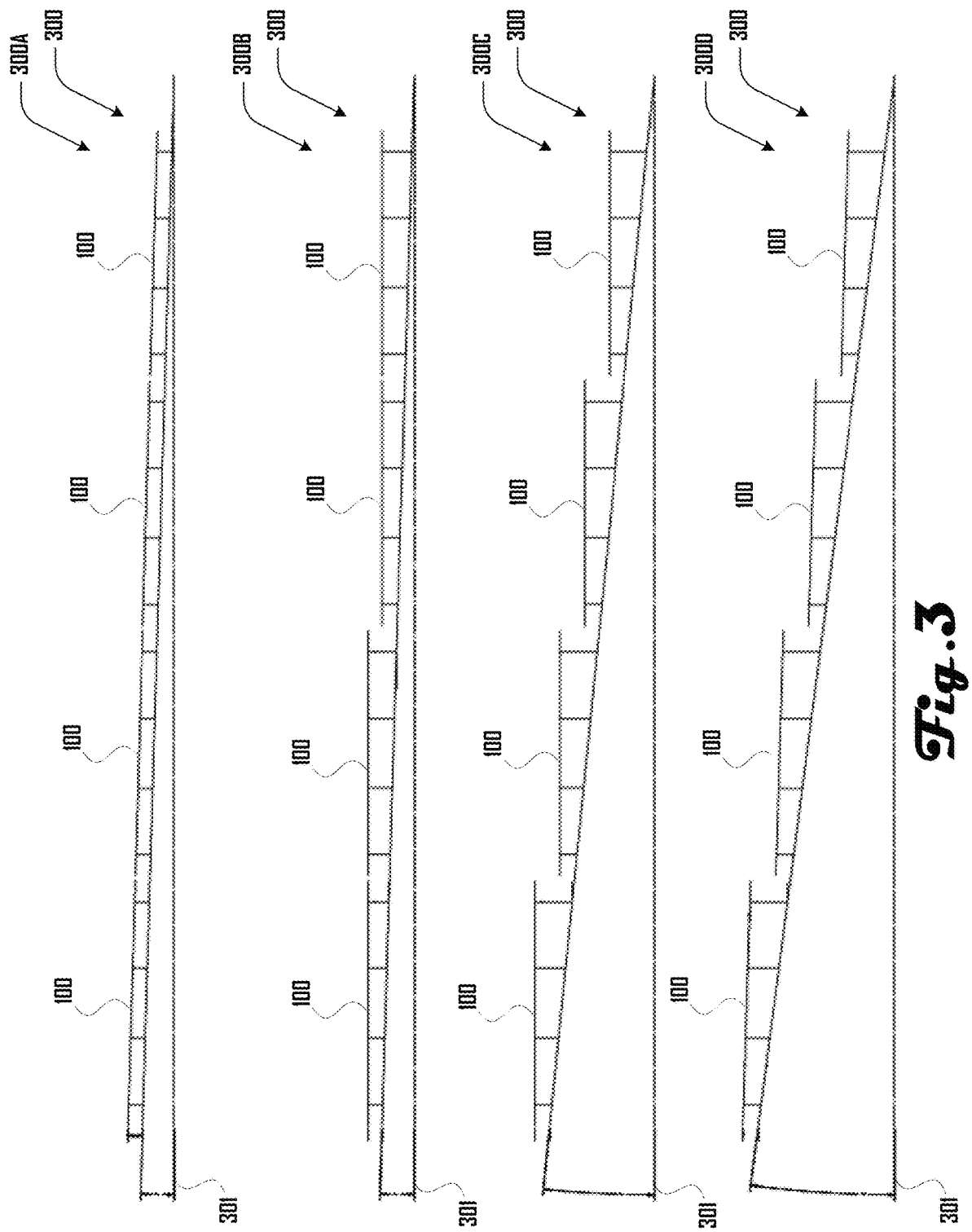
FIG. 3 illustrates examples of solar tracker arrays having a plurality of solar trackers arranged in a linearly aligned row on a portion of the ground having increasing slopes in accordance with four respective example embodiments.

FIG. 3 illustrates examples of solar tracker arrays 300 having a plurality of solar trackers 100 arranged in a linearly aligned row on a portion of the ground 301 having increasing slopes in accordance with four respective example embodiments 300A, 300B, 300C, 300D. For example, the first embodiment 300A has the least slope and shows the trackers having posts 104 that are substantially the same length with the axis of the four solar trackers 100 conforming to the slope of the ground 301 and generally aligned along a common axis.

The second embodiment 300B shows pairs of solar trackers 100 aligned along a common axis that is perpendicular to the pull of gravity (or parallel to level ground), with the pairs being disposed at different axes at different heights above the ground 301. The third embodiment 300C shows solar trackers 100 aligned in parallel, but not coincident axes that are perpendicular to the pull of gravity (or parallel to level ground), with the solar trackers 100 each being disposed at different axes at different heights above the ground 301. The fourth embodiment 300D shows solar trackers 100 aligned in parallel, but not coincident axes, that are not perpendicular to the pull of gravity (or parallel to level ground), with the solar trackers 100 each being disposed at different axes at different heights above the ground 301.

In some examples, it can be desirable to tilt actuators 101 (see e.g., FIG. 2) of the solar trackers 100 to be perpendicular to the slope of the ground 301, while keeping posts 104 plumb to gravity. Accordingly, in some embodiments, a Z axis of an actuator 101 can be installed skew to a Z-axis of a post 104 associated with the actuator 101.

In various embodiments, the solar trackers 100 of a solar tracker array 300 can be pneumatically or fluidically coupled via a pneumatic or fluidic system that can actuate the solar trackers 100 of the solar tracker array 300 in unison. In other words, the solar trackers 100 of the solar tracker array 300 can be driven collectively to have the same angle.

Although FIG. 3 illustrates four example embodiments 300A, 300B, 300C, 300D of solar tracker arrays 300, these examples should not be construed to be limiting on the wide variety of alternative embodiments that are within the scope and spirit of the present disclosure. For example, while FIG. 3 shows solar tracker arrays 300 having solar trackers 100 aligned in linear rows, further embodiments can have tracker arrays 300 aligned in any suitable way, including an arc, a series of parallel rows, and the like. Additionally, in further embodiments, solar tracker arrays 300 can comprise any suitable number of solar trackers 100. Also, in some embodiments, a plurality of solar tracker arrays 300 can be configured into a solar tracker system. While some embodiments can include a movable solar tracker 100, further embodiments can include any suitable solar assembly, which can be movable, fixed tilt, static, or the like.

Some embodiments can include one or more of a ballasted actuator version with no bottom plate, a torque tube or a custom module mounting. Further embodiments can include an expanded web beam, comprising a web of an I-beam or C-channel that can be slit with three offset rows of slits and expanded like expanded metal to form triangular trusses in the web and a higher stiffness beam. In some embodiments, racking configurations can include torque tubes, c-channels, extruded aluminum sections, custom roll formed shapes, hot rolled steel sections, and the like. Still further embodiments can include ballast under the actuator modules to reduce the center of mass height, and such reduced center of mass height can lead to better tracking performance. Other embodiments can include a terrain-following tracker, which can comprise non-moment carrying racking connections to allow the tracker 100 to be installed with variable slope throughout the length of the tracker 100. Some embodiments can include any suitable damper or damper system for flutter reduction, including a centrifugal clutch, viscous damper, viscoelastic materials, friction damper, linear damper, rotary damper, eddy current damper, or the like.

Figure 4:
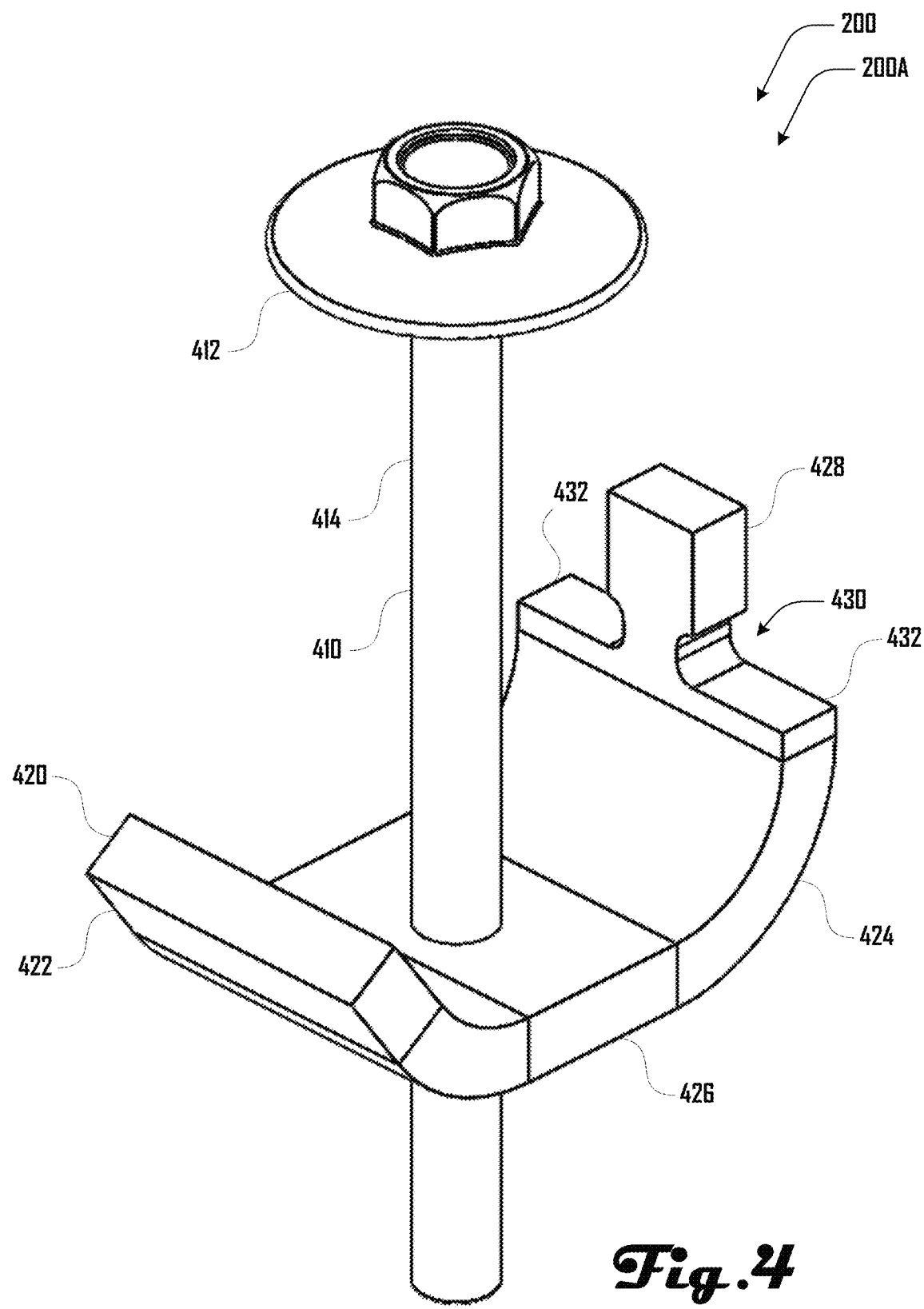
FIG. 4 is a perspective view of a module clamp in accordance with one embodiment.

FIGS. 4, 5a and 5b illustrate an example embodiment 200A of a module clamp 200 in accordance with one embodiment, which can be used to secure photovoltaic modules 103 to a racking system of a solar tracker 100. As shown in this example 200A, the module clamp 200 can comprise a bolt 410 that includes a flange head 412 and a shaft 414.

As shown in this example, the module clamp 200 can comprise a bolt 410 that includes a flange head 412 that is coupled to an end of a shaft 414. The module clamp 200 can also further comprise a J-shaped clamp head 420 having a first arm 422 and a second arm 424 that extend from a base 426. The shaft 414 can extend through the base 426 to a distal end of the shaft 414. In various embodiments turning the bolt 410 can cause the clamp head 420 to move up and down on the shaft 414 of the bolt 410 (e.g., via threads).

The first arm 422 extends from the base 426 at an angle from a main axis of the base 426 and a main axis of the shaft 410. In other words, in this example embodiment 200A, the first arm 422 extends from the base 426 non-perpendicularly and non-parallel to the main axis of the base 426 and the main axis of the shaft 410. For example, in the embodiment of FIGS. 4, 5a and 5b, the first arm 422 extends generally 135° from the base 426 and is disposed generally 45° from the shaft 414. The second arm 424 extends from the base 426 to be generally perpendicular to the main axis of the base 426 and parallel to the main axis of the shaft 410.

In some embodiments, both arms 422, 424 can be perpendicular to the main axis of the base 426, and parallel to the main axis of the shaft 410. In further embodiments, both arms 422, 424 can be non-perpendicular and non-parallel to the main axis of the base 426. For example, both arms 422, 424 can extend 135° from the base 426. Both arms 422, 424 can extend 115° from the base 426 in some examples. In various embodiments, both arms 422, 424 can be non-perpendicular and non-parallel to the shaft 410, but can extend from the base 426 at different angles. The first arm 422 can extend at an angle of 135° from the base 426, and the second arm 424 can extend at an angle of 115° from the base 424, for example.

A tab 428 can extend from an end of the second arm 424 with notches 430 at a base of the tab 428. The end of the second arm can define a first and second shelf 432 on opposing sides of the tab 428. In some embodiments, notches 430 can be absent. As shown in the example 200A of FIGS. 4, 5a and 5b, the clamp head 420 can be generally linear or flat along the width of the head 420 with a single axis of symmetry.

FIGS. 6a, 6b, 7a and 7b illustrate another example embodiment 200B of a module clamp 200, which can be used to secure photovoltaic modules 103 to a racking system of a solar tracker 100. As shown in this example 200B, the module clamp 200 can comprise a bolt 410 that includes a flange head 412 and a shaft 414.

As shown in this example 200B, the module clamp 200 can comprise a bolt 410 that includes a flange head 412 that is coupled to an end of a shaft 414. The module clamp 200 can also further comprise a J-shaped clamp head 420 having a first arm 422 and a second arm 424 that extend from a base 426. The shaft 414 can extend through the base 426 to a distal end of the shaft 414 with the clamp head 420 coupled to the shaft 414 via a nut 660.

The first arm 422 extends from the base 426 at an angle from a main axis of the base 426 and a main axis of the shaft 410. In other words, the first arm 422 extends from the base 426 non-perpendicularly and non-parallel to the main axis of the base 426 and the main axis of the shaft 410. For example, in the embodiment of FIGS. 6a, 6b, 7a and 7b, the first arm extends generally 135° from the base 426 and is disposed generally 45° from the shaft 414. The second arm 424 extends from the base 426 to be generally perpendicular to the main axis of the base 426 and parallel to the main axis of the shaft 410. A tab 428 can extend from an end of the second arm 424 at a base of the tab 428.

In contrast to the example 200A of FIGS. 4, 5a and 5b, where the clamp head 420 is flat along the width of the clamp head 420, the clamp head 420 as shown in FIGS. 6a, 6b, 7a and 7b comprises sidewalls 640 along opposing edges of the first and second arms 422, 424 and base 426 to define a concave head cavity 650.

The flange head 412 can comprise serrations 670 or other suitable features (e.g., bumps, notches, extruded features, or the like), which in some embodiments can be configured to break anodization of modules 103 to enable electric bonding (e.g., and electric bonding path). In some examples, the bolt 410 can comprise a standard bolt with a sheet metal top cap, or with a captive washer.

The module clamp 200 can also include a clamp head 420, which in some examples can comprise a clamp made from formed sheet metal (steel, aluminum, or the like), cast metal, extruded aluminum, or the like. Various examples of the clamp head 420 can comprise sharp edges to pierce anodization of solar modules (e.g., serrations, bumps, notches, extruded features, or the like). Some embodiments can include a tab 428 configured to keep equal spacing between modules 103. For example, the tab 428 or a similar suitable structure can be formed with the bottom clamp; attached via a weld or other adhesive; or fastened to the bottom clamp 420 by other suitable method. The spacing tab 428 in some embodiments can be formed from any other suitable method or structure and attached to the bolt 410 rather than the bottom clamp 420. In the example 200A of FIGS. 4, 5a and 5b, the tab 428 can allow the bolt 410 to rotate while the spacing tab 428 remains aligned between the panels 103 above the clamp head 420.

Some examples can include a cinch nut. Some examples can include a female thread, rolled threads, a rivet nut, a captive nut, or any other structure of preventing unwanted thread rotation such as chemical locking compounds (either pre-applied or applied at time of installation); stakes to prevent rotation; lockwire; and the like. Some examples can also include a standard nut. In various embodiments, a module clamp 200 can comprise an extra wide flange head bolt and/or a bottom clamp.

While two example embodiments 200A, 200B of a module clamp 200 are shown herein, it should be clear that any suitable elements of such examples 200A, 200B can be present and/or absent in further embodiments, so the examples herein should not be construed to be limiting on the wide variety of module clamps 200 of various further embodiments.

In various embodiments, module clamps 200 can be configured to secure solar modules 103 onto solar trackers 100 in a method that accomplishes one or more of the of the following: electrical bonding and mechanical securement performed by a single fastener; adjoining pairs of solar panels 103 mechanically secured by a single assembly; reduce time required for module installation; and reduce the amount of wasted area between solar modules compared to other top-clamp style clamps.

Some embodiments of a module clamp 200 can be desirable over module coupling systems and methods that include one or more of: bolting through module frames; clamping near the center of modules onto torque tubes; through bolting onto cross beams and then using a U-bolt to secure the cross beams to a torque tube; clamps that fit into custom rails, such as T-slotted fasteners.

In some embodiments, a module clamp 200 can be made via or comprise one or more of: metal stamping; a cold formed bolt; rolled threads; aluminum extrusions; steel; electroplated zinc coating; galvanized coating; pre or post applied threadlocker, such as Loctite; and the like.

In some embodiments, a module clamp 200 as disclosed herein can be desirable over module coupling systems and methods that: require precise alignment of racking and modules to make sure holes match up; require multiple tools to install; add extra material to the structure; require more expensive custom rail shapes; comprise top clamps have multiple parts—installation difficulty; have wider module gap.

Further embodiments of a module clamp 200 can comprise one or more of the following: instead of custom bolt 410, use fastener stack: bolt+washer+grounding feature (e.g. weeb); instead of being built in prevailing torque, use an alternative (e.g., Loctite on threads—pre or post applied; a jam nut; and the like); instead of rolled threads, use additional fastener (e.g., PEM nut pressed into hole; rivet nut; flange nut; nut and washer); and the clamp head 410 and/or bolt 420 can comprise teeth or serrations that pierce the frame of a module 103 and/or rail 102 for more bonding.

Various embodiments of a module clamp 200 can comprise novel elements such as a prevailing torque feature formed into the clamp material; threading directly into clamp material; and integrating top clamp and bolt into one part.

Various embodiments of a module clamp 200 can be desirable over other module coupling systems and methods by reducing overall part count; adaptability to a number of rail section geometries; minimizing module gapping; needing only one tool for installation; and/or not requiring precision alignment of rails, purlins or racking.

One or more module clamp 200 can be used to install photovoltaic modules or cells 103 on a rail 102 (e.g., a purlin, racking, or the like). For example, an angled first arm 422 of the clamp head 420 can hook under the rail 102. The tab 428 can be disposed between and extend between frames of adjacent modules 103. In various embodiments, the tab 428 can be desirable for providing consistent spacing between adjacent modules 103 and preventing rotation of the clamp head 420 when the bolt 410 is tightened.

The bolt 410 can be rotated, which can cause the clamp head 420 to move toward the flange head 412 such that the module clamp 200 is tightened to clamp modules 130 to the rail 102 (e.g., via corresponding threads of the bolt 410 and clamp head 420). Serrations 670 can break anodization of the modules 103 and the clamp head 420 can engage the rail 102 (e.g., a galvanized steel purlin) to provide a bonding path between the rail 102 and module 103. A prevailing torque feature of some embodiments can prevent vibrational loosening during shipment and operation of the solar tracker 100.

For example, FIG. 8 illustrates a pair of module clamps 200 (circled) that couple a pair of adjacent modules 103 to a pair of rails 102 (e.g., Z-purlins). The module clamps 200 are shown disposed within a slot 800 between the modules 103 with the module clamps 200 coupled to a respective rail 102. For example, the slot 800 can be defined by sidewalls 904 of the modules 103.

FIGS. 9 and 10 illustrate a module clamp 200 coupling a module 103 with a rail 102. As shown in FIG. 10, the rail 102 can comprise a Z-purlin 1000 having a web 1010, with a first flange 1020 that includes a first terminal lip 1021 and with a second flange 1030 that includes a second terminal lip 1031. The module 103 is shown disposed on the first flange 1020 of the Z-purlin 1000 with the first arm 422 of the clamp head 424 extending over the first terminal lip 1021 and engaging the first flange 1020 on a face of the first flange 1020 opposing a face of the first flange 1020 that the module 103 engages.

In various embodiments, one or more modules 103 can comprise a top face 901 and bottom face 902 and a sidewall 904. For example, in FIG. 9, the module 103 is shown having a frame 903 with the flange head 412 engaging the frame 903 at a top end 901 of the frame 903 with a bottom end 902 of the frame 903 engaging a top of the second arm 424 of the clamp head 420. The tab 428 is shown extending along and engaging a side-face of the frame 903 of the module 103. The bolt 410 is shown in a tightened configuration where the module 103 and rail 102 are held securely together. While a single module 103 is shown in the examples of FIGS. 9 and 10 for purposes of clarity, it should be clear that a second module 103 can be disposed opposing the first module 103 coupling on an opposing side of the module clamp 200 mirroring the configuration shown in FIGS. 9 and 10. For example, FIG. 8 shows adjacent modules in such a configuration. However, in various embodiments, modules 103 at ends of a tracker 100 can be coupled as shown in FIGS. 9 and 10.

Additionally, while a single rail 102 is shown in the example of FIGS. 9 and 10, further embodiments can comprise any suitable plurality of rails 102 and corresponding module clamps 200. For example, FIG. 8 illustrates an example tracker 100 having two rails 102. Moreover, while examples such as FIG. 8 illustrate a pair of modules 103 as part of a tracker 100, further embodiments can have any suitable plurality of modules 103 (e.g., as shown in FIGS. 1a and 1b) coupled with any suitable plurality of module clamps 200.

Figure 11:
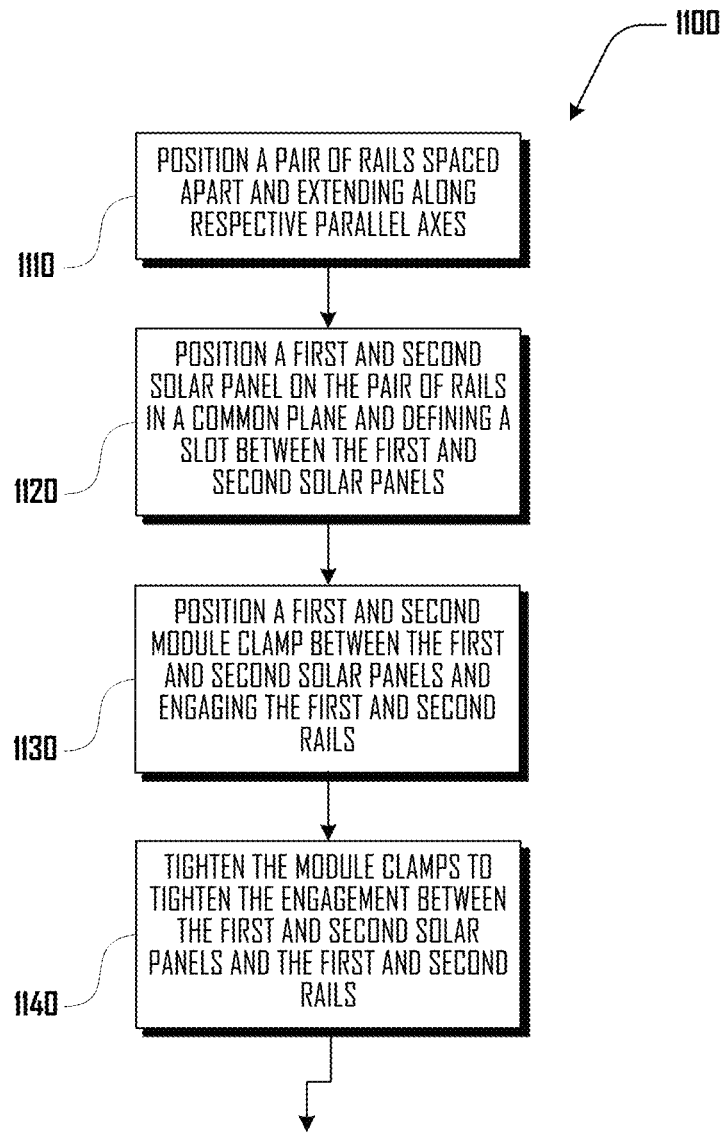
FIG. 11 illustrates a method of coupling solar panels to a pair of rails via a plurality of module clamps to form at least a portion of a solar tracker.

FIG. 11 illustrates a method 1100 of coupling solar panels 103 to a pair of rails 102 via a plurality of module clamps 200 to form at least a portion of a solar tracker 200. The method 1100 begins at 1110 where a pair of rails 102 are positioned spaced apart and extending along respective parallel axes. For example, FIGS. 1a, 1b and FIG. 8 illustrates example embodiments having a pair of rails 102 are positioned spaced apart and extending along respective parallel axes.

The method 1100 continues at 1120 where a first and second solar panel 103 are positioned on the pair of rails 102 in a common plane and defining a slot 800 between the first and second solar panels 103. For example, FIG. 8 illustrates an example of an embodiment with a first and second solar panel 103 positioned on a pair of rails 102 in a common plane and defining a slot 800 between the first and second solar panels 103.

At 1130, a first and second module clamp 200 are positioned between the first and second solar panels 103 and engaging the first and second rails 102. For example, FIG. 8 illustrates an example of an embodiment with a first and second module clamp 200 positioned between first and second solar panels 103. FIGS. 9 and 10 illustrate an example embodiment of how a module clamp 200 can engage a rail 102.

Some embodiments can include positioning a first and second module clamp 200 between first and second planar solar panels 103 in a slot 800 between the first and second planar solar panels 103, the first module clamp 200 engaging the first and second planar solar panels 103 and the first elongated rail 102, and the second module clamp 200 engaging the first and second planar solar panels 103 and the second elongated rail 102.

As discussed herein, in various embodiments (e.g., as shown in FIGS. 4-10), module clamps 200 can comprise a bolt 410 that includes a shaft 414 that extends within the slot 800 between the first and second planar solar panels 103 and past the bottom faces of the first and second planar solar panels 103 and can include a flange head 412 that is coupled to a first end of the shaft 414 that engages the top face of the first and second planar solar panels 103.

The module clamp 200 can further comprise a J-shaped clamp head 420 that includes a base 426, with the shaft 414 extending through and rotatably coupled to the base 426 such that turning the bolt 410 and/or nuts 660 causes the clamp head 420 to move up and down on the shaft 414 of the bolt 410; a first arm 422 that extends from a first side of the base 426 and engages one of the respective first and second elongated rails 102; and a second arm 424 that extends from a second side of the base 426, the second arm 424 including a tab 428 that extends from an end of the second arm 424 with the end of the second arm defining a first and second shelf 432 on opposing sides of the tab 428, with the tab 428 extending within the slot 800 between first and second planar solar panels 103 and with the first and second shelf 432 engaging the bottom faces of the first and second planar solar panels 103.

Additionally, the present method 1100 should not be construed to require a specific order of steps to achieve the described structure. For example, a first solar panel 103 can be positioned on rails 102, and a pair of module clamps 200 can be positioned engaging the first solar panel 103 along the sidewall 904, and then a second solar panel 103 can be positioned engaging the first and second module clamps 200 to define the slot 800. Similarly, in another example, a first solar panel 103 can be positioned on rails 102, and a first module clamp 200 can be positioned engaging the first solar panel 103 along the sidewall 904, and then a second solar panel 103 can be positioned engaging the first module clamp 200, a second module clamp 200 can then be positioned between the solar panels 103 to define the slot 800.

Returning to FIG. 11, the method 1100 continues at 1140 where the module clamps 200 are tightened to tighten the engagement between the first and second solar panels 103 and the first and second rails 102 via the module clamps 200. For example, some embodiments can include tightening the bolts 410 of the module clamps 200 by turning the bolts 410 and/or nuts 660 to cause the respective clamp heads 420 and flange heads 412 of the module clamps 200 to move closer together to tighten the engagement between the first and second planar solar panels 103, the first and second module clamps 200 and first and second elongated rails 102.

In some embodiments, such tightening can cause a break in an anodization of the first and second planar solar panels 103 to generate an electric bonding path between the first and second elongated rails 102 and the first and second planar solar panels 103 via the first and second module clamps 200.

In some embodiments, such tightening can be mechanical such as by rotating the bolt 410 of the module clamps 200 such that the bolt 410 and clamp head 420 screw together. However, in further embodiments, various other suitable tightening mechanisms can be used to bring a flange head 412 and clamp head 420 closer together or to generate a force that pulls or pushes the flange head 412 and clamp head 420 toward each other. For example, in one embodiment, an elastic band can couple the flange head 412 and clamp head 420, and the elasticity of the band can couple the solar panels 103 to the rails 102 via tension between the flange head 412 and clamp head 420.

Figure 12A:
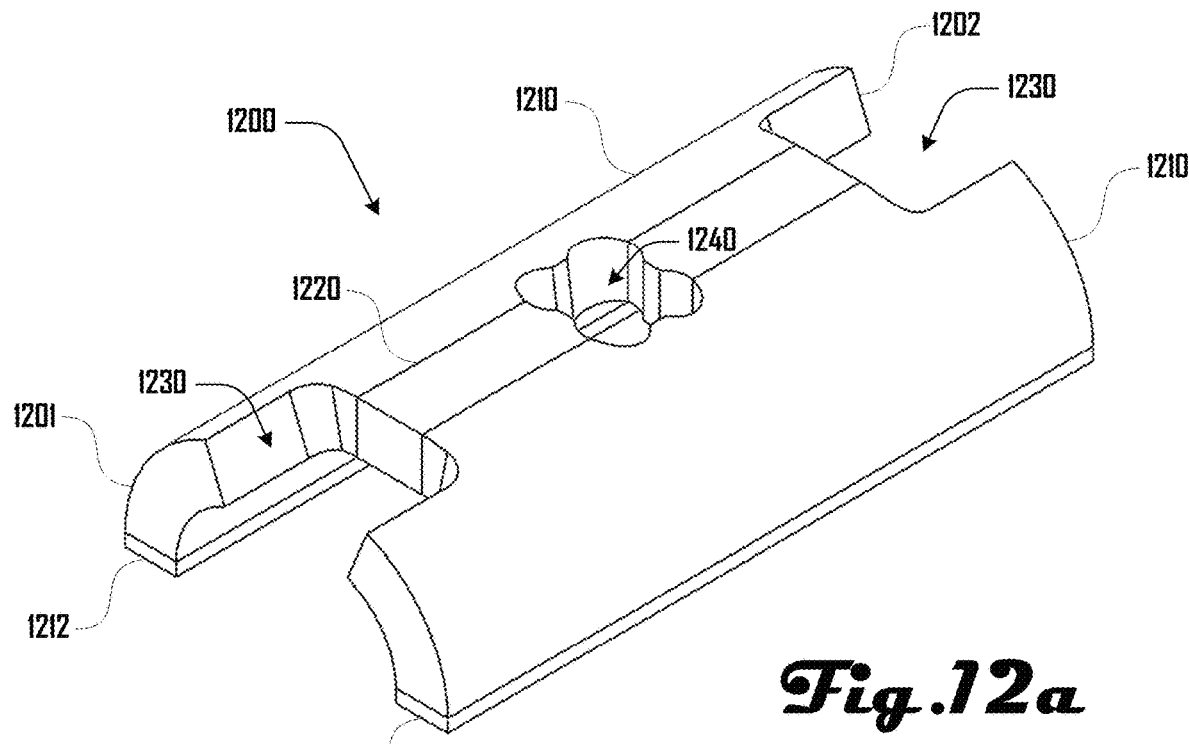
FIG. 12a illustrates a perspective view of a top clamp in accordance with one embodiment.
Figure 12B:
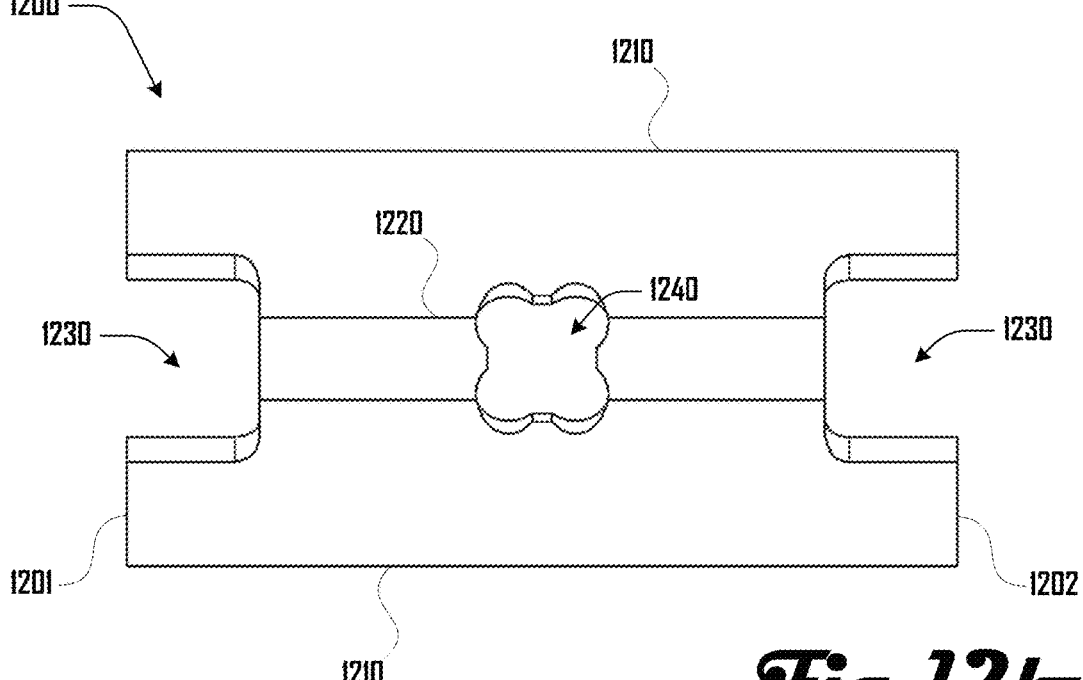

Turning to FIGS. 12a and 12b a top clamp 1200 in accordance with one embodiment is illustrated. The top clamp 1200 comprises a first and second leg 1210 that extend from a top 1220 to respective bases 1212 to define a C-shaped profile that extends from a first end 1201 to a second end 1202 of the top clamp. The first and second ends 1201, 1202 define a respective nock 1230. The top clamp 1200 further defines a hole 1240. The hole 1240 is shown as having a four-chamber configuration, which in some examples can be desirable for preventing the rotation of the square neck of a carriage bolt; however, the hole 1240 can be configured in various suitable ways in further embodiments such as round holes, square holes, rectangular holes, oval shaped slots, or the like.

Turning to FIGS. 13a, 13b, 14a and 14b, in another embodiment 200C of a module clamp 200, the shaft 414 of a bolt 410 can extend through the hole 1240 of the top clamp 1200 such that the top clamp 1200 is held on the bolt 410 opposing the clamp head 420 with the flange head 412 retaining the top clamp 1200 by the flange head 412 being too large to pass through the hole 1240. As discussed herein, the distance between the flange head 412 and the clamp head 420 can be changed by rotating the bolt 410 which is held by a nut 660, by rotating the nut 660 and/or by rotating the clamp head 420, or the like.

In various embodiments, the bolt 410 can be various suitable types of bolt, including a carriage bolt, hex bolt, hex bolt with washer, flange head bolt, or the like. Additionally, the nut 660 can be various suitable structures which may be separate from or coupled to the clamp head 420. For example, the nut 660 can comprise a hex nut, hex flange nut, nut with locking feature (e.g., nylock, all-metal prevailing torque, deformed thread, pre or post applied Loctite), and the like.

Figure 13A:
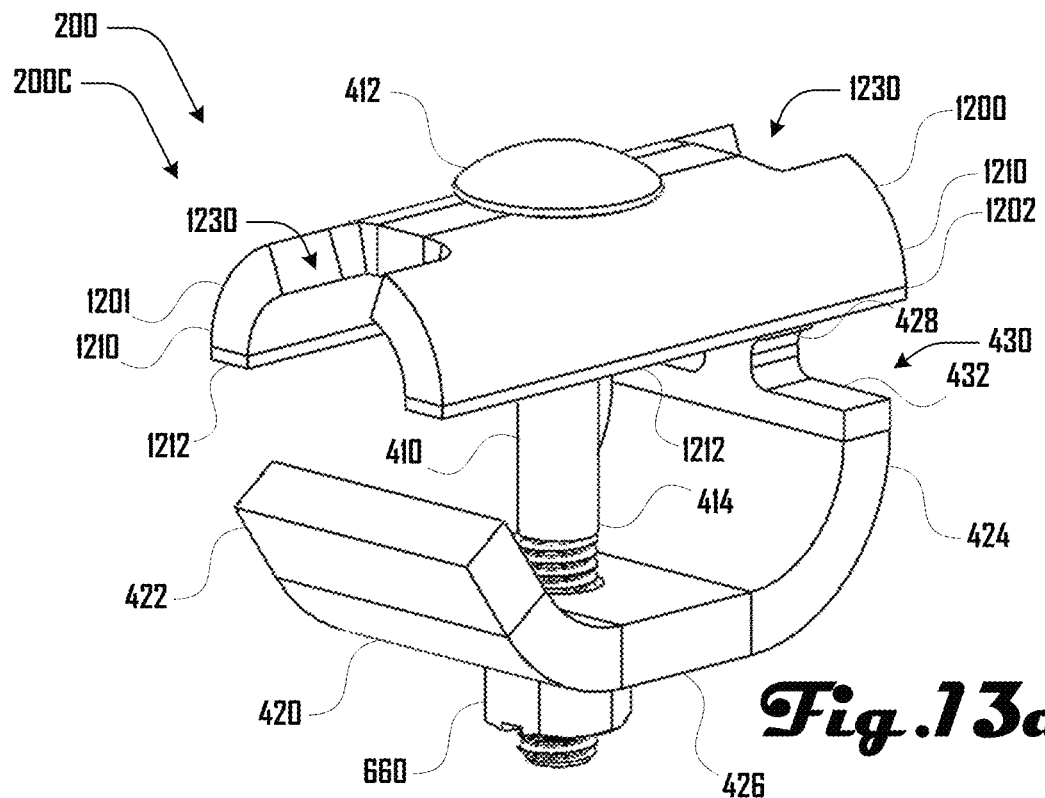
FIG. 13a illustrates a perspective view of another embodiment of a module clamp comprising a top clamp.

The distance between the flange head 412 and the clamp head 420 can set a maximum distance that the top clamp 1200 can be spaced apart from the clamp head 420. For example, FIGS. 13a and 14a illustrate a configuration of the module clamp 200C where the top clamp 1200 is spaced apart from the clamp head 420 at a greater distance compared to the configuration of the module clamp 200C illustrated in FIGS. 13b and 14b.

Figure 13B:
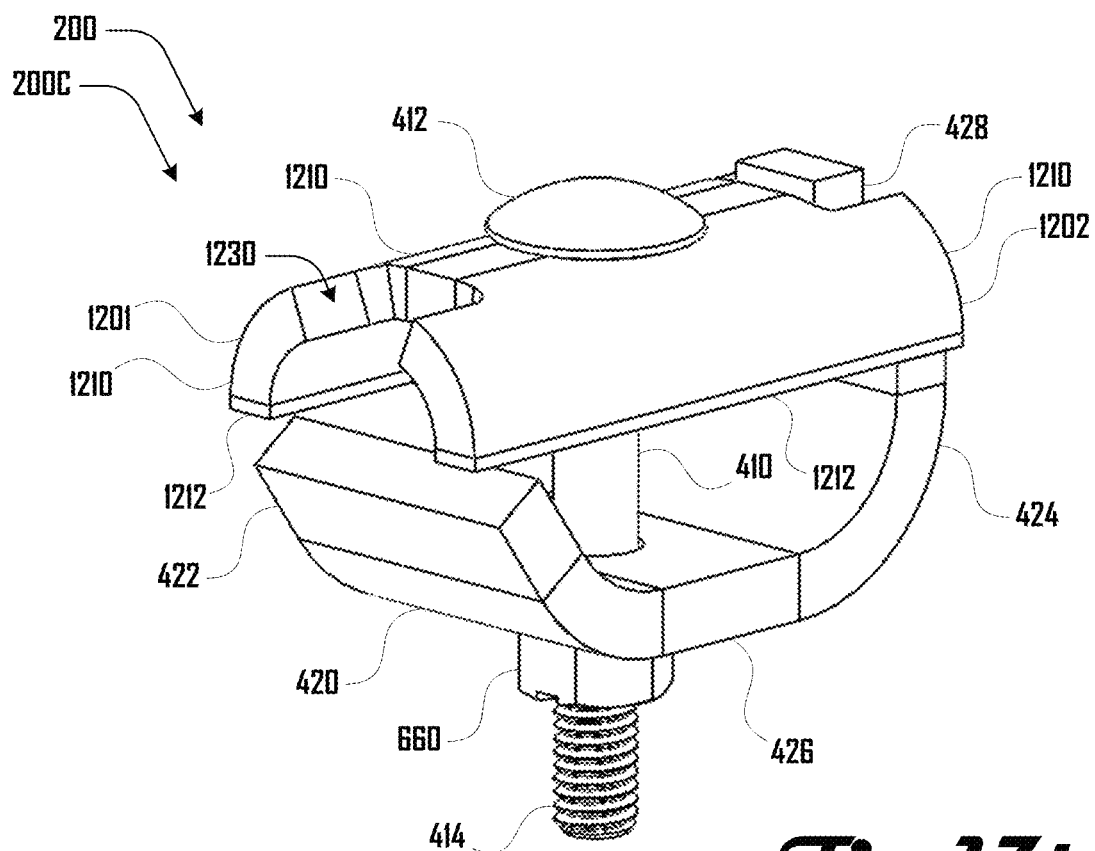
Figure 14A:
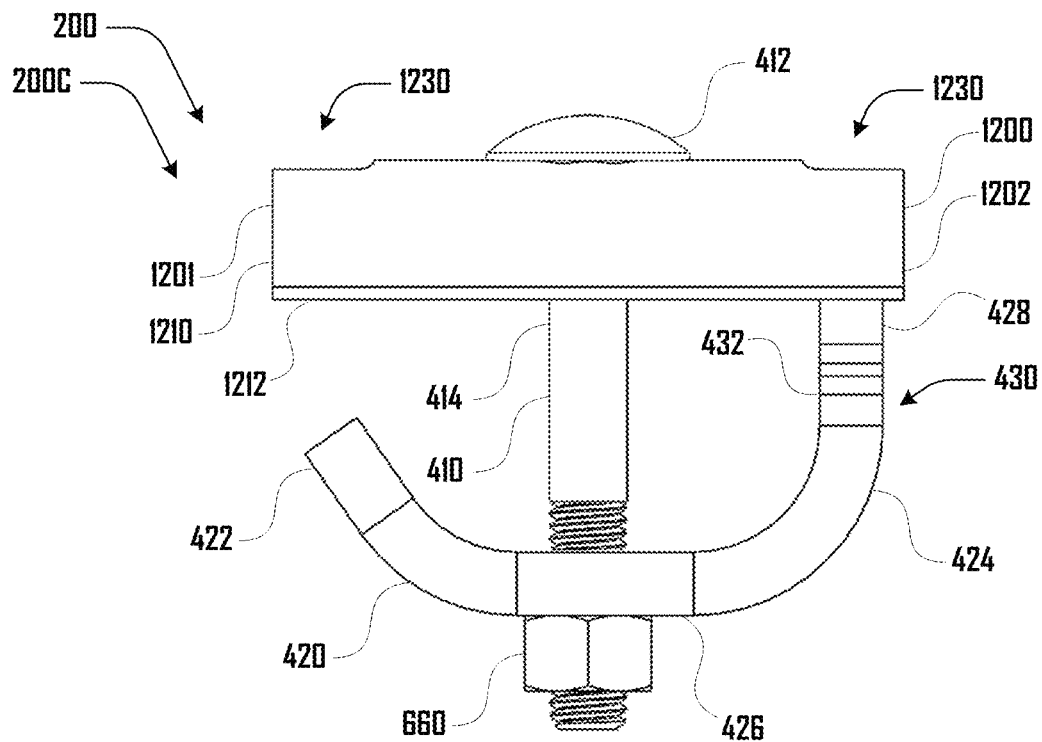
FIG. 14a illustrates a perspective view of the embodiment of the module clamp of FIGS. 13a and 13b.
Figure 14B:
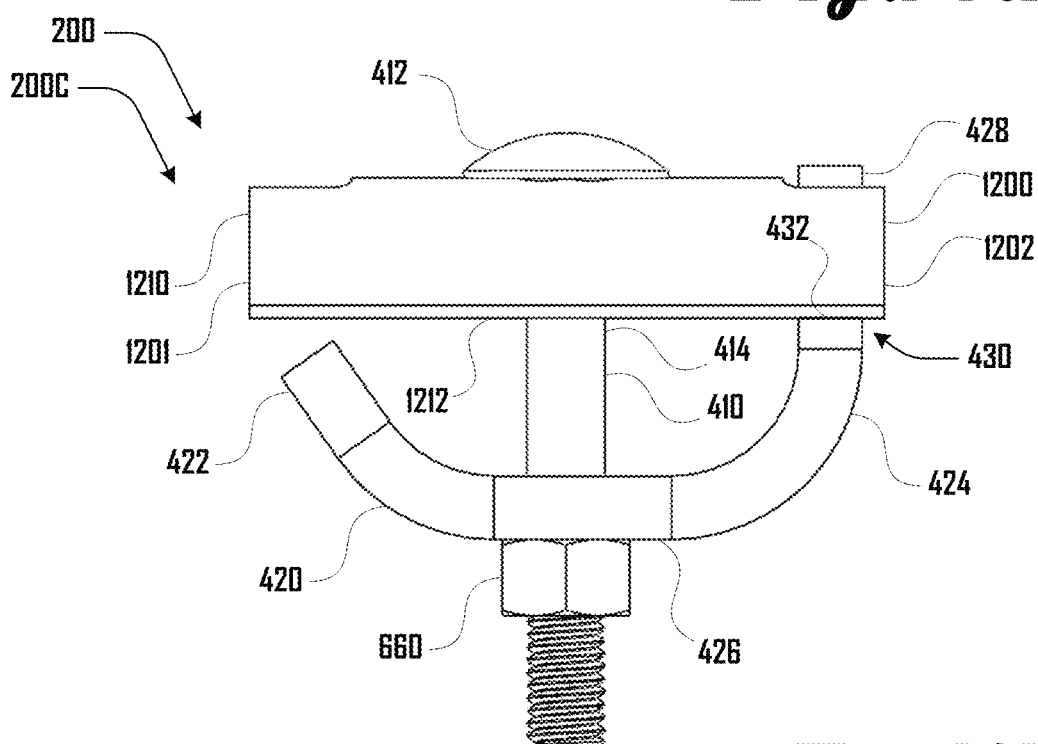
FIG. 14b illustrates a perspective view of the embodiment of the module clamp of FIGS. 13a, 13b and 14a with the top clamp and clamp head in a coupled configuration.

As shown in FIGS. 13b and 14b, a nock 1230 of the top clamp 1200 can be configured to surround and/or engage the tab 428 of the clamp head 420 with the ends 1212 of the legs 1210 engaging the first and second shelf 432 on opposing sides of the tab 428. For example as shown in FIG. 14b, in one configuration of the module clamp 200C, the ends 1212 of the legs 1210 of the top clamp 1200 can engage the first and second shelf 432 of the clamp head 420 on opposing sides of the tab 428, with a top portion of the tab 428 extending past a top face of the top clamp 1200. Additionally, as shown in the example of FIG. 14b, the tab 428 does not extend past the face of the second end 1202. In some embodiments, the tab 428 and nock 1230 can be sized such that the tab 428 engages one or more internal faces of the nock 1230 or can be sized such that the nock 1230 is larger than a maximum width of the tab 428.

Figure 16:
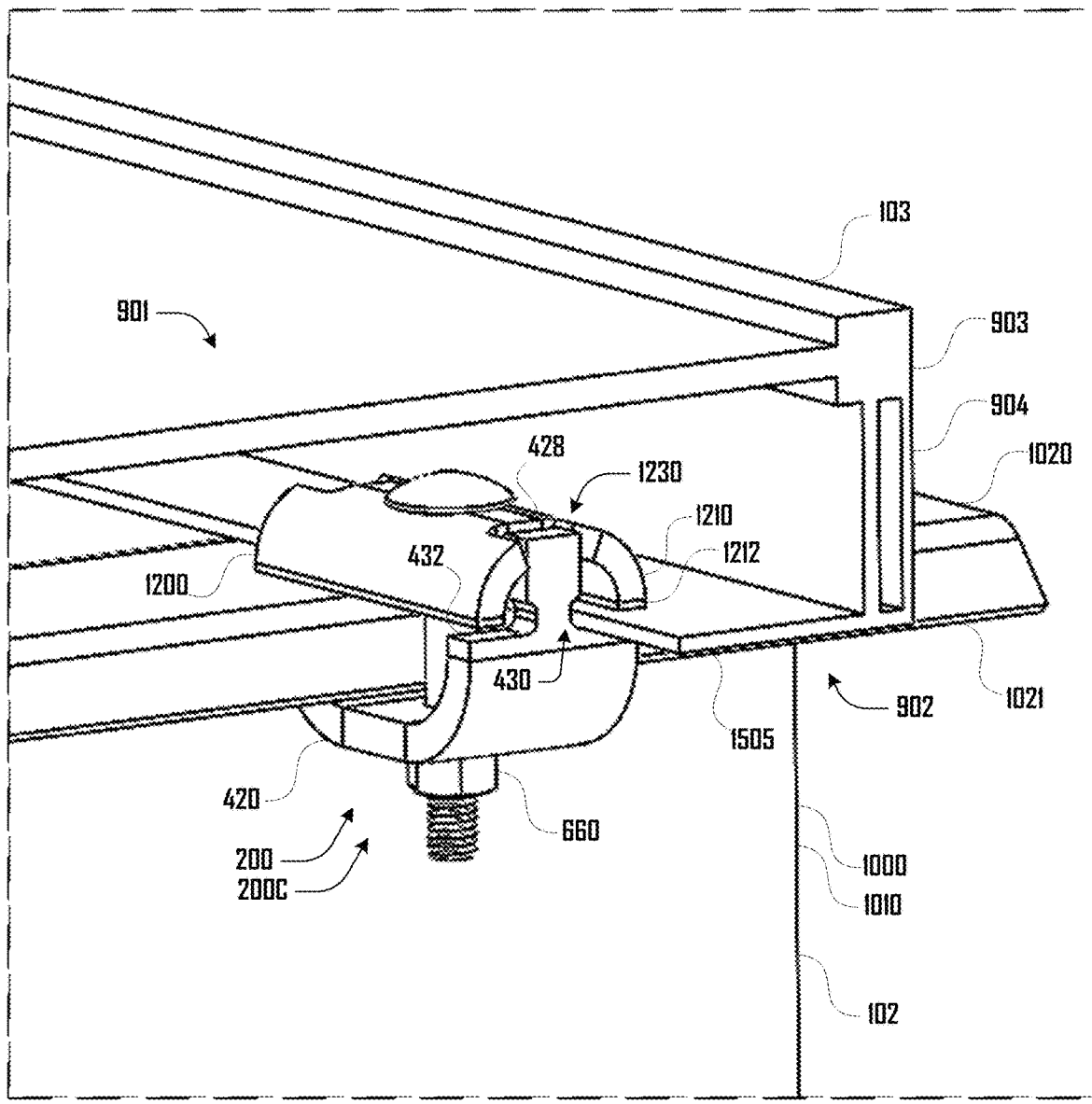
FIG. 16 illustrates another example of the module clamp of FIGS. 13a, 13b, 14a and 14b coupling a module to a rail.

FIGS. 15, 16 and 17 illustrate example embodiments of a module clamp 200 coupling a module 103 with a rail 102. The rail 102 can comprise a Z-purlin 1000 having a web 1010, with a first flange 1020 that includes a first terminal lip 1021 and with a second flange 1030 that includes a second terminal lip 1031. The module 103 is shown disposed on the first flange 1020 of the Z-purlin 1000 with the first arm 422 of the clamp head 424 extending over the first terminal lip 1021 and engaging the first flange 1020 on a face of the first flange 1020 opposing a face of the first flange 1020 that the module 103 engages.

The module 103 can comprise a frame 903 that includes a frame flange 1505 that extends inwardly from a sidewall 904 of the module 103 perpendicular to the sidewall 904 and parallel to the top face 901 of the module 103. A bottom face 902 of the frame flange 1505 can engage a shelf 432 of the module head 420 and a terminal end of the frame flange 1505 can reside within a notch 430 at the base of the tab 428 of the module head 420. The top clamp 1200 can be disposed over an internal face of the frame flange 1505 and parallel to the length or and edge of the frame flange 1505 with a leg 1210 of the top clamp 1200 and engaging the internal face of the frame flange 1505 at the end 1212 of the leg 1210. The nut 660 of the module clamp 200C and/or the bolt 410 can be rotated to tighten the top clamp 1200 against frame flange 1505, which can couple the module 103 to the rail 102 via the module clamp 200.

In various embodiments, the tab 428 of the module head 420 can reside within a nock 1230 of the top clamp 1200 (see e.g., FIGS. 13a, 14a and 15-17) in a configuration of the module clamp 200 where the module clamp 200 couples the module 103 to the rail 102. Such a configuration can be desirable to prevent rotation of the top clamp 1200 relative to the module head 420, which could result in the top clamp 1200 twisting off the frame flange 1505 or the module head 420 disengaging the rail 102 or frame 903.

In some embodiments (e.g., as shown in FIG. 16), the leg 1210 of the top clamp 1200 that opposes the leg 1210 engaging the frame 904 may not engage a shelf 432 of the module head 420. However, in further embodiments, the leg 1210 of the top clamp 1200 that opposes the leg 1210 engaging the frame 904 can engage the shelf 432 of the module head 420 opposing the frame 904 and/or the leg 1210 of the top clamp 1200 that opposes the leg 1210 engaging the frame 904 can engage the first flange 1020 of the rail 102.

While the examples of FIGS. 15-17 illustrate a single rail 102, further embodiments can include any suitable plurality of rails 102 (e.g., two rails 102 as shown in FIGS. 1a and 1b), and coupling of the module clamp 200C as discussed herein can be applied to such a plurality of rails 102.

Additionally, while a specific example embodiments of a top clamp 1200 and clamp head 420 are shown in the embodiment 200C of FIGS. 13a-17, further embodiments can have elements configured in various suitable ways. For example, a top clamp 1200 can be various suitable lengths, or shapes in further embodiments, or can include only a single nock 1230. Additionally, in some examples, the top clamp 1200 can be configured to generate and electrical bonding path as discussed herein (e.g., via tightening causing a break in an anodization) or such a feature can be specifically absent.

In some embodiments, a solar tracker 100 can comprise a plurality of different module clamps 200, which can be used to secure one or more modules 103 to one or more rails in different ways. For example, a solar tracker 100 can comprise a plurality of modules 102 that are coupled via one or more module clamp 200 (e.g., as shown in FIGS. 8-10 with example embodiments 200A or 200B) with a plurality of different module clamps 200 coupling modules 103 at ends of a tracker 100 (e.g., as shown in FIGS. 15-17 with example embodiment 200C).

In such examples, having a plurality of different module clamps 200 that couple modules 103 to one or more rails 102 in different ways, it can be desirable to have portions of such different module clamps 200 be the same. For example, embodiments 200A, 200C can be configured to have the same module heads 420 and/or bolts 410 with a top clamp 1200 being present or absent depending on the desired method of coupling one or more modules 103 to one or more rails 102.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. For example, elements of embodiments discussed herein should be construed to be exclusive to that embodiment, and in further embodiments, various elements of one embodiment can be interchanged with elements of other embodiments, or various elements can be absent.

What is claimed is:

1. A method of coupling solar panels to a pair of rails via a plurality of module clamps to form at least a portion of a solar assembly, the method composing:
   positioning a first and second planar solar panel on a first and second elongated rail, the first and second elongated rails spaced apart and extending along respective parallel axes, the first and second planar solar panels being positioned adjacent and in a common plane defining a slot between the first and second planar solar panels, the first and second planar solar panels having a top face and bottom face and a sidewall;
   positioning a first and second module clamp between the first and second planar solar panels in the slot between the first and second planar solar panels, the first module clamp engaging the first and second planar solar panels and the first elongated rail, and the second module clamp engaging the first and second planar solar panels and the second elongated rail, the first and second module clamps comprising:
   a bolt that includes:
     a shaft that extends within the slot between the first and second planar solar panels and past the bottom faces of the first and second planar solar panels; and
     a flange head that is coupled to a first end of the shaft that engages the top face of the first and second planar solar panels; and
   a J-shaped clamp head that includes:
     a base, with the shaft extending through and rotatably coupled to the base such that turning the bolt or a nut causes the clamp head to move up and down on the shaft of the bolt,
     a first arm that extends from a first side of the base and engages one of the respective first and second elongated rails; and
     a second arm that extends from a second side of the base, the second arm including a tab that extends from an end of the second arm with the end of the second arm defining a first and second shelf on opposing sides of the tab, the tab extending within the slot between the first and second planar solar panels and with the first and second shelf engaging the bottom faces of the first and second planar solar panels; and
   tightening the bolts of the module clamps by turning the bolts or nuts to cause the respective clamp heads and flange heads of the module clamps to move closer together to tighten the engagement between the first and second planar solar panels, first and second module clamps and first and second elongated rails, the tightening causing a break in an anodization of the first and second planar solar panels to generate an electric bonding path between the first and second elongated rails and the first and second planar solar panels via the first and second module clamps.

2. The method of claim 1, wherein the first and second module clamps engage the first and second planar solar panels with the base spaced apart from and not touching the first and second solar planar panels.

3. The method of claim 1, wherein the first and second module clamps respectively engage the first and second elongated rails with the first arms of the clamp heads extending over a first terminal lip of a respective elongated rail and engaging a first flange of the respective elongated rail on a first face of the first flange opposing a second face of the first flange that the first and second solar panels engage.

4. The method of claim 1, wherein the first and second module clamps engage the first and second planar solar panels with portions of the sidewalls of the first and second planar solar panels that define the slot between the first and second planar solar panels engaging sides of the tabs of the first and second module clamps to define the slot having a consistent width along the length of the slot.

5. The method of claim 1, further comprising:
   positioning a third and fourth module clamp proximate to an end of the first solar panel with the third module clamp engaging a frame flange of the first solar panel and the first elongated rail, and the fourth module clamp engaging the frame flange of the first solar panel and the second elongated rail, the third and fourth module clamps comprising:
   a second bolt that includes:
     a second shaft; and
     a top bolt that is disposed at a second first end of the second shaft that engages frame flange of the first solar panel and defines one or more nock; and
   a J-shaped second clamp head that includes:
     a second base, with the second shaft extending through and rotatably coupled to the second base such that turning the second bolt or a second nut causes the second clamp head to move up and down on the second shaft of the second bolt,
     a second first arm that extends from a second first side of the base and engages one of the respective first and second elongated rails; and a second second arm that extends from a second second side of the base, the second second arm including a second tab that extends from an end of the second second arm with the end of the second second arm defining a second first and second second shelf on opposing sides of the second tab, the second tab extending within the nock of the top bolt; and tightening the second bolts or second nuts of the third and fourth module clamps by turning the second bolts or the second nuts to cause the respective second clamp heads and top clamps of the third and fourth module clamps to move closer together to tighten the engagement between the first solar panel and the first rail and the first solar panel and the second rail.

6. A solar assembly generated by the method of claim 1.

7. A method of coupling solar panels to one or more rails via one or more module clamps to form at least a portion of a solar assembly, the method composing:

positioning a first and second solar panel on at least a first rail, the first and second solar panels being positioned adjacent and defining a slot between the first and second solar panels, the first and second solar panels having a top face and bottom face and a sidewall;

positioning a module clamp between the first and second solar panels in the slot between the first and second solar panels, the module clamp engaging the first and second solar panels and the first rail, the module clamp comprising:

a bolt that includes:
  a shaft that extends within the slot between the first and second solar panels and past the bottom faces of the first and second solar panels; and
  a flange head that is coupled to a first end of the shaft that engages the top face of the first and second solar panels; and a J-shaped clamp head that includes:
  a base, with the shaft extending through and rotatably coupled to the base such that turning the bolt or a nut causes the clamp head to move up and down on the shaft of the bolt,
  a first arm that extends from a first side of the base and engages the first rail; and
  a second arm that extends from a second side of the base, the second arm including a tab that extends from an end of the second arm with the end of the second arm defining a first and second shelf on opposing sides of the tab, the tab extending within the slot between the first and second solar panels and with the first and second shelf engaging the bottom faces of the first and second solar panels; and tightening the bolt of the module clamp by turning the bolt or the nut to cause the clamp head and flange head of the module clamp to move closer together to tighten the engagement between the first and second solar panels, the module clamp and the first rail.

8. The method of claim 7, wherein the tightening causes a break in an anodization of the first and second solar panels to generate an electrical bonding path between the first rail and the first and second solar panels via the module clamp.

9. The method of claim 7, wherein the module clamp engages the first and second solar panels with the base spaced apart from and not touching the first and second solar panels.

10. The method of claim 7, wherein the module clamp engages the first rail with the first arm of the clamp head extending over a first terminal lip of the first rail and engaging a first flange of the rail on a first face of the first flange opposing a second face of the first flange that the first and second solar panels engage.

11. The method of claim 7, wherein the module clamp engages the first and second solar panels with portions of the sidewalls of the first and second solar panels that define the slot between the first and second solar panels engaging sides of the tab of the module clamp to define the slot having a consistent width along the length of the slot.

12. The method of claim 7, further comprising:

positioning a third and fourth module clamp proximate to an end of the first solar panel with the third module clamp engaging a frame flange of the first solar panel and the first rail, and the fourth module clamp engaging the frame flange of the first solar panel and the second rail, the third and fourth module clamps comprising:

a second bolt that includes:
  a second shaft; and
  a top bolt that is disposed at a second first end of the second shaft that engages frame flange of the first solar panel and defines one or more nock; and a J-shaped second clamp head that includes:
  a second base, with the second shaft extending through and rotatably coupled to the second base such that turning the second bolt or a second nut causes the second clamp head to move up and down on the second shaft of the second bolt,
  a second first arm that extends from a second first side of the base and engages one of the respective first and second elongated rails; and
  a second second arm that extends from a second second side of the base, the second second arm including a second tab that extends from an end of the second second arm with the end of the second second arm defining a second first and second second shelf on opposing sides of the second tab, the second tab extending within the nock of the top bolt; and tightening the second bolts or second nuts of the third and fourth module clamps by turning the second bolts or the second nuts to cause the respective second clamp heads and top clamps of the third and fourth module clamps to move closer together to tighten the engagement between the first solar panel and the first rail and the first solar panel and the second rail.

13. A solar assembly generated by the method of claim 7.

14. A method of coupling solar panels to one or more rails via one or more module clamps to form at least a portion of a solar assembly, the method composing:

positioning a first and second solar panel on at least a first rail, the first and second solar panels being positioned adjacent and defining a slot between the first and second solar panels, the first and second solar panels having a top face and bottom face and a sidewall;

positioning a module clamp between the first and second solar panels in the slot between the first and second solar panels, the module clamp engaging the first and second solar panels and the first rail, the module clamp comprising:

a bolt that includes:
  a shaft that extends within the slot between the first and second solar panels and past the bottom faces of the first and second solar panels; and
  a flange head that is coupled to a first end of the shaft that engages the top face of the first and second solar panels; and a clamp head that includes:
  a base, with the shaft coupled to the base;

a first arm that extends from a first side of the base and engages the first rail; and a second arm that extends from a second side of the base, the second arm including a tab that extends from an end of the second arm within the slot between the first and second solar panels.

15. The method of claim 14 further comprising: tightening the bolt of the module clamp by turning the bolt or a nut to cause the clamp head and flange head of the module clamp to move closer together to tighten the engagement between the first and second solar panels, the module clamp and the first rail.

16. The method of claim 15, wherein the tightening causes a break in an anodization of the first and second solar panels to generate a bonding path between the first rail and the first and second solar panels via the module clamp.

17. The method of claim 14, wherein the end of the second arm defines a first and second shelf on opposing sides of the tab, with the first and second shelf engaging the bottom faces of the first and second solar panels.

18. The method of claim 14, wherein the module clamp engages the first rail with the first arm of the clamp head extending over a first terminal lip of the first rail and engaging a first flange of the rail on a first face of the first flange opposing a second face of the first flange that the first and second solar panels engage.

19. The method of claim 14, wherein the module clamp engages the first and second solar panels with portions of the sidewalls of the first and second solar panels that define the slot between the first and second solar panels engaging sides of the tab of the module clamp to define the slot having a consistent width along the length of the slot.

20. The method of claim 14, further comprising:

positioning a second module clamp proximate to an end of the first solar panel with the second module clamp engaging a frame flange of the first solar panel and the first rail, the second module clamp comprising:

a second bolt that includes:
  a second shaft; and
  a top bolt that is disposed at a second first end of the second shaft that engages the frame flange of the first solar panel; and a second clamp head that includes:
  a second base, with the second shaft extending through the second base such that turning the second bolt or a second nut causes the second clamp head to move up and down on the second shaft of the second bolt,
  a second first arm that extends from a second first side of the base and engages the first rail; and
  a second second arm that extends from a second second side of the base, the second second arm including a second tab that extends from an end of the second second arm with the end of the second second arm defining a second first and second second shelf on opposing sides of the second tab; and tightening the second bolt or second nut of second module clamp by turning the second bolt or the second nut to cause the second clamp head and top clamp of the second module clamp to move closer together to tighten the engagement between the first solar panel and the first rail.

21. A solar assembly generated by the method of claim 14.

\* \* \* \* \*